US011501793B2

(12) United States Patent
Davis et al.

(10) Patent No.: US 11,501,793 B2
(45) Date of Patent: Nov. 15, 2022

(54) METHODS AND APPARATUS TO PERFORM SIGNATURE MATCHING USING NOISE CANCELLATION MODELS TO ACHIEVE CONSENSUS

(71) Applicant: The Nielsen Company (US), LLC, New York, NY (US)

(72) Inventors: Jeremey M. Davis, New Port Richey, FL (US); Christen V. Nielsen, Dunedin, FL (US); Kevin Keqiang Deng, Safety Harbor, FL (US); Alexander Topchy, New Port Richey, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 62 days.

(21) Appl. No.: 16/994,095

(22) Filed: Aug. 14, 2020

(65) Prior Publication Data

US 2022/0051690 A1    Feb. 17, 2022

(51) Int. Cl.
*G10L 25/51* (2013.01)
*G10L 25/57* (2013.01)

(52) U.S. Cl.
CPC .................................. *G10L 25/57* (2013.01)

(58) Field of Classification Search
CPC ......... G10L 25/57; G10L 25/00; G10L 25/03; G10L 25/27; G10L 25/72; G10L 25/48; G10L 25/51; G10L 25/75; G10L 25/78; G10L 25/81; G10L 25/83; G10L 21/00; G10L 21/01; G10L 21/02; G10L 21/0208; G10L 21/0216; G10L 21/028; G10L 21/06

(Continued)

(56) References Cited

U.S. PATENT DOCUMENTS 7,680,653 B2    3/2010  Yeldener
2011/0088053 A1  4/2011  Lee
(Continued)

OTHER PUBLICATIONS

International Searching Authority, "International Search Report," issued in connection with International Patent Application No. PCT/US2021/046004, dated Nov. 29, 2021, 5 pages.

(Continued)

*Primary Examiner* — Qi Han
(74) *Attorney, Agent, or Firm* — Hanley, Flight & Zimmerman, LLC

(57) ABSTRACT

Examples are disclosed to perform signature matching using noise cancellation models to achieve consensus. Example apparatus disclosed herein include a signature matcher to compare a first stream of monitored media signatures to streams of reference signatures representative of corresponding reference media to determine a first signature match, and compare a second stream of monitored media signatures to the streams of reference signatures to determine a second signature match; a match selector to use at least one the first signature match or the second signature match to identify a first one of the reference media corresponding to the monitored media data; and a creditor interface to output identification data for the first one of the reference media identified with the at least one the first signature match or the second signature match, the identification data to be used to credit a media exposure corresponding to the monitored media.

20 Claims, 12 Drawing Sheets

(58) Field of Classification Search
USPC .................................. 704/500, 503, 200, 216
See application file for complete search history.

(56) References Cited

U.S. PATENT DOCUMENTS

| | | |
|---|---|---|
| 2012/0304212 A1 | 11/2012 | Lee |
| 2012/0321095 A1 | 12/2012 | Hetherington et al. |
| 2013/0251189 A1* | 9/2013 | McMillan .............. H04H 60/56 |
| | | 382/100 |
| 2014/0330413 A1* | 11/2014 | Anniballi .............. G06F 16/683 |
| | | 700/94 |
| 2017/0048566 A1* | 2/2017 | Srinivasan ........... H04N 21/251 |
| 2019/0306577 A1 | 10/2019 | Jeong et al. |
| 2019/0371357 A1 | 12/2019 | Ramaswamy et al. |
| 2020/0149290 A1* | 5/2020 | Lee .................. H04N 21/23109 |

OTHER PUBLICATIONS

International Searching Authority, "Written Opinion," issued in connection with International Patent Application No. PCT/US2021/046004, dated Nov. 29, 2021, 3 pages.

\* cited by examiner

400 ⟶

```
QPKT: 426 SID: 4000 TS: 695010 STRG: 286
QPKT: 427 SID: 4000 TS: 695012 STRG: 272
QPKT: 428 SID: 4000 TS: 695014 STRG: 258
QPKT: 429 SID: 4000 TS: 695016 STRG: 252
NO MATCH QPKT: 430
NO MATCH QPKT: 431
NO MATCH QPKT: 432
NO MATCH QPKT: 433
NO MATCH QPKT: 434
QPKT: 435 SID: 4000 TS: 695029 STRG: 292
QPKT: 436 SID: 4000 TS: 695031 STRG: 305
QPKT: 437 SID: 4000 TS: 695033 STRG: 308
QPKT: 438 SID: 4000 TS: 695035 STRG: 301
QPKT: 439 SID: 4000 TS: 695037 STRG: 298
QPKT: 440 SID: 4000 TS: 695039 STRG: 310
```

405 ⟶

```
QPKT: 426 SID: 4000 TS: 695010 STRG: 386
QPKT: 427 SID: 4000 TS: 695012 STRG: 372
QPKT: 428 SID: 4000 TS: 695014 STRG: 358
QPKT: 429 SID: 4000 TS: 695016 STRG: 350
QPKT: 430 SID: 4000 TS: 695018 STRG: 352
QPKT: 431 SID: 4000 TS: 695020 STRG: 367
QPKT: 432 SID: 4000 TS: 695022 STRG: 374
QPKT: 433 SID: 4000 TS: 695025 STRG: 368
QPKT: 434 SID: 4000 TS: 695026 STRG: 378
QPKT: 435 SID: 4000 TS: 695029 STRG: 394
QPKT: 436 SID: 4000 TS: 695031 STRG: 405
QPKT: 437 SID: 4000 TS: 695033 STRG: 408
QPKT: 438 SID: 4000 TS: 695035 STRG: 401
QPKT: 439 SID: 4000 TS: 695037 STRG: 408
QPKT: 440 SID: 4000 TS: 695039 STRG: 410
```

410 ⟶

```
QPKT: 426 SID: 4000 TS: 695010 STRG: 102
QPKT: 427 SID: 4000 TS: 695012 STRG: 152
QPKT: 428 SID: 4000 TS: 695014 STRG: 158
QPKT: 429 SID: 4000 TS: 695016 STRG: 150
QPKT: 430 SID: 4000 TS: 695018 STRG: 152
QPKT: 911 SID: 4000 TS: 695020 STRG: 167
NO MATCH QPKT: 432
NO MATCH QPKT: 433
NO MATCH QPKT: 434
QPKT: 435 SID: 6000 TS: 695029 STRG: 194
QPKT: 436 SID: 6000 TS: 695031 STRG: 205
QPKT: 437 SID: 6000 TS: 695033 STRG: 208
QPKT: 438 SID: 6000 TS: 695035 STRG: 201
QPKT: 439 SID: 6000 TS: 695037 STRG: 208
QPKT: 440 SID: 6000 TS: 695039 STRG: 210
```

QPKT: 426 SID: 4000 TS: 695010
QPKT: 427 SID: 4000 TS: 695012
QPKT: 428 SID: 4000 TS: 695014
QPKT: 429 SID: 4000 TS: 695016
QPKT: 430 SID: 4000 TS: 695018
QPKT: 431 SID: 4000 TS: 695020
QPKT: 432 SID: 4000 TS: 695022
QPKT: 433 SID: 4000 TS: 695025
QPKT: 434 SID: 4000 TS: 695026
QPKT: 435 SID: 4000 TS: 695029
QPKT: 436 SID: 4000 TS: 695031
QPKT: 437 SID: 4000 TS: 695033
QPKT: 438 SID: 4000 TS: 695035
QPKT: 439 SID: 4000 TS: 695037
QPKT: 440 SID: 4000 TS: 695039

FIG. 4B

```
QPKT: 526 SID: 4000 TS: 695010 STRG: 386        QPKT: 526 SID: 4000 TS: 695010 STRG: 286        QPKT: 526 SID: 4000 TS: 695010 STRG: 284
QPKT: 527 SID: 4000 TS: 695012 STRG: 372        QPKT: 527 SID: 4000 TS: 695012 STRG: 272        QPKT: 527 SID: 4000 TS: 695012 STRG: 262
QPKT: 528 SID: 4000 TS: 695014 STRG: 358        QPKT: 528 SID: 4000 TS: 695014 STRG: 258        QPKT: 528 SID: 4000 TS: 695014 STRG: 252
QPKT: 529 SID: 4000 TS: 695016 STRG: 350        QPKT: 529 SID: 7000 TS: 695016 STRG: 150        QPKT: 529 SID: 4000 TS: 695016 STRG: 250
QPKT: 530 SID: 4000 TS: 695018 STRG: 352        QPKT: 530 SID: 7000 TS: 695018 STRG: 152        QPKT: 530 SID: 4000 TS: 695018 STRG: 252
QPKT: 531 SID: 4000 TS: 695020 STRG: 367        QPKT: 531 SID: 7000 TS: 695020 STRG: 67         QPKT: 531 SID: 4000 TS: 695020 STRG: 266
QPKT: 532 SID: 4000 TS: 695022 STRG: 374        NO MATCH QPKT: 532                              QPKT: 532 SID: 4000 TS: 695022 STRG: 274
QPKT: 533 SID: 4000 TS: 695025 STRG: 368        QPKT: 533 SID: 8000 TS: 695025 STRG: 168        QPKT: 533 SID: 4000 TS: 695025 STRG: 256
QPKT: 534 SID: 4000 TS: 695026 STRG: 378        NO MATCH QPKT: 534                              QPKT: 534 SID: 4000 TS: 695026 STRG: 272
QPKT: 535 SID: 4000 TS: 695029 STRG: 394        QPKT: 535 SID: 4000 TS: 695029 STRG: 294        QPKT: 535 SID: 4000 TS: 695029 STRG: 294
QPKT: 536 SID: 4000 TS: 695031 STRG: 405        QPKT: 536 SID: 4000 TS: 695031 STRG: 305        QPKT: 536 SID: 4000 TS: 695031 STRG: 310
QPKT: 537 SID: 4000 TS: 695033 STRG: 408        QPKT: 537 SID: 4000 TS: 695033 STRG: 308        QPKT: 537 SID: 4000 TS: 695033 STRG: 304
QPKT: 538 SID: 4000 TS: 695035 STRG: 401        QPKT: 538 SID: 4000 TS: 695035 STRG: 301        QPKT: 538 SID: 4000 TS: 695035 STRG: 300
QPKT: 539 SID: 4000 TS: 695037 STRG: 408        QPKT: 539 SID: 4000 TS: 695037 STRG: 308        QPKT: 539 SID: 4000 TS: 695037 STRG: 320
QPKT: 540 SID: 4000 TS: 695039 STRG: 410        QPKT: 540 SID: 4000 TS: 695039 STRG: 310        QPKT: 540 SID: 4000 TS: 695039 STRG: 302
       500                                              505                                             510
```

```
QPKT:  526 SID: 4000 TS: 695010
QPKT:  527 SID: 4000 TS: 695012
QPKT:  528 SID: 4000 TS: 695014
QPKT:  529 SID: 4000 TS: 695016
QPKT:  530 SID: 4000 TS: 695018
QPKT:  531 SID: 4000 TS: 695020
QPKT:  532 SID: 4000 TS: 695022
QPKT:  533 SID: 4000 TS: 695025
QPKT:  534 SID: 4000 TS: 695026
QPKT:  535 SID: 4000 TS: 695029
QPKT:  536 SID: 4000 TS: 695031
QPKT:  537 SID: 4000 TS: 695033
QPKT:  538 SID: 4000 TS: 695035
QPKT:  539 SID: 4000 TS: 695037
QPKT:  540 SID: 4000 TS: 695039
```

FIG. 5B

METHODS AND APPARATUS TO PERFORM SIGNATURE MATCHING USING NOISE CANCELLATION MODELS TO ACHIEVE CONSENSUS

FIELD OF THE DISCLOSURE

This disclosure relates generally to media identification systems, and, more particularly, to perform signature matching using noise cancellation models to achieve consensus.

BACKGROUND

A media monitoring entity can generate audio signatures from a media signal. Audio signatures are a condensed representation of the media signal that can be used to subsequently identify the media. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

FIG. 4A illustrates example matching results for a stream of monitored signature packets using the meter data analyzer of FIGS. 1 and/or 3.

FIG. 4B illustrates an example output of the matching results of FIG. 4A using the meter data analyzer of FIGS. 1 and/or 3.

FIG. 5A illustrates alternative example matching results for a stream of monitored signature packets using the meter data analyzer of FIGS. 1 and/or 3.

FIG. 5B illustrates an example output of the matching results of FIG. 5A using the meter data analyzer of FIGS. 1 and/or 3.

Figure 1:
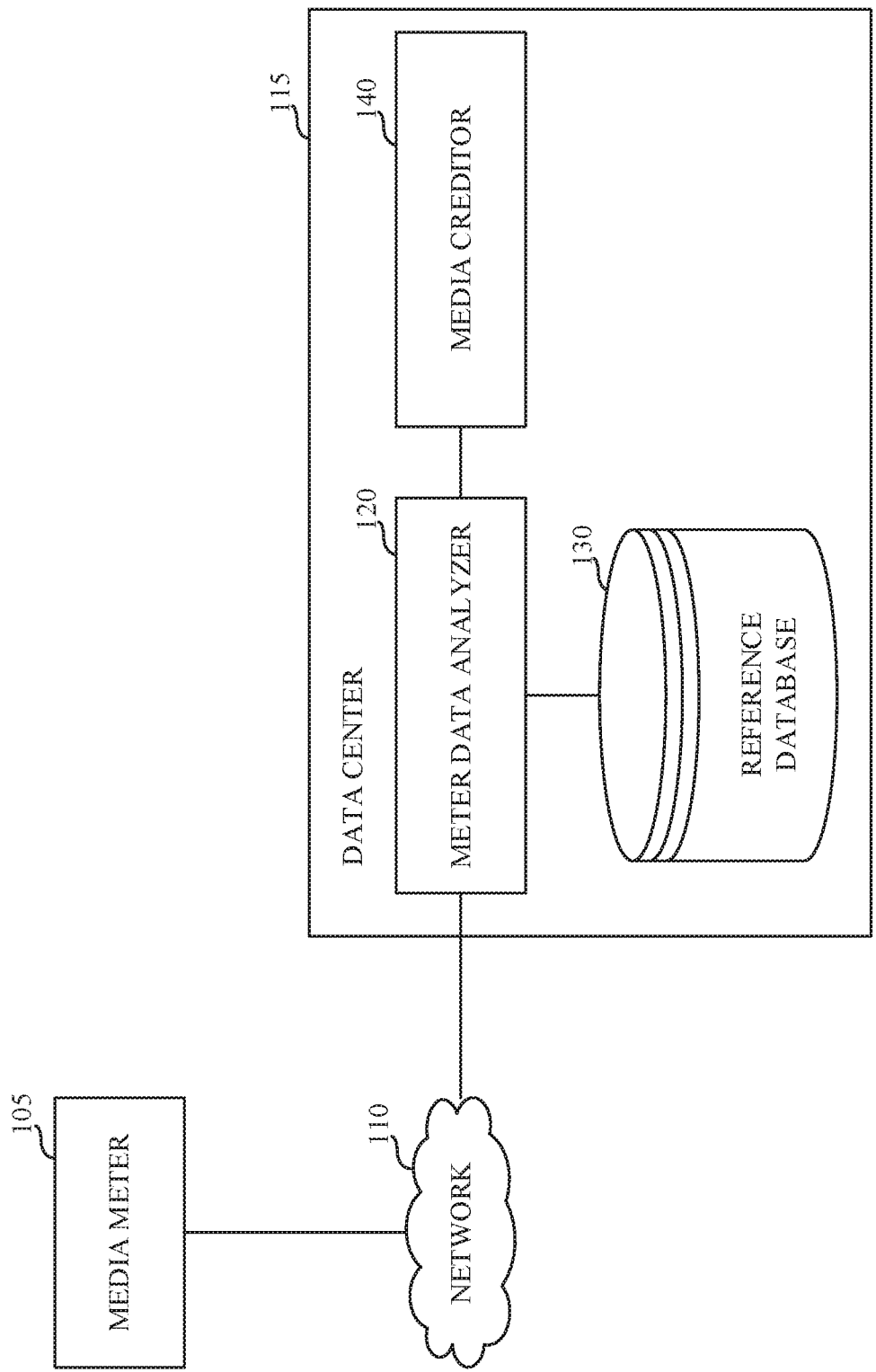
FIG. 1 is a block diagram of an example environment in which the teachings of this disclosure may be implemented.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

As used herein, the term "media" includes any type of content and/or advertisement delivered via any type of distribution medium. Thus, media includes television programming and/or advertisements, radio programming and/or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.), etc.

Examples disclosed herein utilize signature matching to identify media. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signature is found, the monitored media can be identified as corresponding to the particular reference media represented by the reference signature that matched with the monitored signature. In some examples, signature matching is based on streams/sequences of signatures such that, when a match between a stream of monitored signatures and a stream of reference signatures is found, the monitored media can be identified as corresponding to the particular reference media represented by the stream of reference signatures that matched the stream of monitored signatures. Because attributes, such as an identifier of the media, a presentation time, a broadcast channel, etc., are collected for the reference signature(s), these attributes may then be associated with the monitored media whose monitored signature matched the reference signature(s).

Media monitoring entities, such as The Nielsen Company (US), LLC, desire knowledge regarding how users interact with media devices such as smartphones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, watermarks, etc., and/or any combination thereof. These references are generated by a media monitoring entity (e.g., at a media monitoring station (MMS), etc.) by monitoring a media source feed, identifying any encoded watermarks and determining signatures associated with the media source feed. In some examples, the media monitoring entity can hash the determined signatures. A media monitoring entity may additionally and/or alternatively generate reference signatures for downloaded reference media, reference media transmitted to the media monitoring entity from one or more media providers, etc.

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures and hashed signatures. In some examples, media monitoring entities store generated reference databases and gathered monitoring data on cloud storage services (e.g., Amazon Web Services™, etc.). To allow the crediting of time-shifted viewing (e.g., viewing media via a digital video recorder (DVR), etc.), the stored references are retained for a period time after the initial presentation of the media.

In some examples, a user may be exposed to media in environments with ambient noise (e.g., white noise, background conversation, sudden loud noises, traffic, pets, etc.). In such environments, media monitoring meters that use microphones to detect media exposure (e.g., audio media monitoring meters) can have difficulty with accurately matching audio media signatures with reference signatures. In some examples, ambient noise can interfere with the determination/generation of audio media signatures with adequate quality to compare to line-quality reference signatures generated at the reference site. In some examples, the audio monitoring meters have difficulty in differentiating, and/or determining monitoring information that can be used to differentiate, ambient noise from actual media content. For example, the audio monitoring meters have difficulty differentiating, and/or determining monitoring information that can be used to differentiate, if monitored audio corresponds to a dog barking in a living room of a household or to a dog is barking in the media being presented by a media device.

Methods and apparatus disclosed herein improve signature matching for media identification using media signatures obtained in environments that contain ambient noise. Example methods disclosed herein include a media meter generating one signature stream based on the raw audio collected at the media meter, and then generating one or more signature streams based on modified audio resulting from application of one or more noise reduction models. Disclosed examples include applying a consensus model to match the various media signature streams with the reference signature streams. Disclosed examples include determining if all signature streams match the same media identified by the matching reference signatures, which indicates a high validity that the media identified by all the signature matches is the correct media content. Disclosed examples further include determining if one signature match identifies one media content and the other signature matches do not identify that media content. In such examples, disclosed examples compare the strengths of the various signature matches to identify the correct media to associated with the media exposure event.

FIG. 1 is a block diagram of an example environment 100 in which the teachings of this disclosure may be implemented. The example environment 100 of FIG. 1 includes an example media meter 105, an example network 110, and an example data center 115. The example data center 115 includes an example meter data analyzer 120, an example reference database 130, and an example media creditor 140.

In the illustrated example of FIG. 1, the example media meter 105 collects media monitoring information. In some examples, the media meter 105 is associated with (e.g., installed on, coupled to, etc.) a media device. For example, a media device associated with the media meter 105 presents media (e.g., via a display, etc.). In some examples, the media device associated with the media meter 105 additionally or alternatively presents the media on separate media presentation equipment (e.g., speakers, a display, etc.). For example, the media device associated with the media meter 105 can include a personal computer, an Internet-enabled mobile handset (e.g., a smartphone, an iPod®, etc.), a video game console (e.g., Xbox®, PlayStation 3, etc.), a tablet computer (e.g., an iPad®, a Motorola™ Xoom™, etc.), a digital media player (e.g., a Roku® media player, a Slingbox®, a Tivo®, etc.), a television, a desktop computer, a laptop computer, a server, etc. In some examples, the media meter 105 can have direct connections (e.g., physical connections) to the media device to be monitored, and/or may be connected wirelessly (e.g., via Wi-Fi, via Bluetooth, etc.) to the media device to be monitored. The example media meter 105 identifies events in the media and/or the media monitoring information that are of interest. The example media meter 105 can use any content identification technology to identify media events of interest such as, for example, automatic content recognition (ACR), watermarks, signatures, etc.

Additionally or alternatively, in some examples, the media meter 105 is a portable meter carried by one or more individual people. In some examples, the media meter 105 monitors media presented on media devices by collecting audio data (e.g., via a microphone, etc.). In the illustrated example, the media meter 105 monitors media presented to one or more people associated with the media meter 105 by collecting audio data from the media and generating monitoring data. For example, the media meter 105 can determine a stream of media signatures (e.g., generate media signatures, extract media signatures, etc.) associated with the presented media during a time interval. In some examples, the media meter 105 generates monitored media signatures using the raw audio data collected from the media and/or applying noise reduction model(s) to the raw audio data. An example implementation of the media meter 105 is described below in conjunction with FIG. 2.

The example network 110 of the illustrated example of FIG. 1 is a network used to transmit the monitoring data to the data center 115. In some examples, the network 110 can be the Internet and/or any other suitable external network. In some examples, any other suitable means of transmitting the monitoring data to the data center 115 can be used.

The example data center 115 of the illustrated example of FIG. 1 is an execution environment used to implement the example meter data analyzer 120, the example reference database 130, and the example media creditor 140. In some examples, the data center 115 is associated with a media monitoring entity. In some examples, the data center 115 can be a physical processing center (e.g., a central facility of the media monitoring entity, etc.). Additionally or alternatively, the data center 115 can be implemented via a cloud service (e.g., Amazon Web Services™, etc.). In this example, the data center 115 can further store and process reported signature reference data.

The example meter data analyzer 120 of the illustrated example of FIG. 1 processes the gathered monitoring data to detect and identify media associated with the monitoring data from the example media meter 105. In some examples, the meter data analyzer 120 receives the monitored media signature streams generated by the media meter 105. The meter data analyzer 120 performs signature matching between the monitored media signature streams and reference signature streams from the example reference database 130. In some examples, the meter data analyzer 120 determines a consensus signature match for the media based on the individual signature matches between the different monitored media signature streams (e.g., based on the raw audio and one or more noise reduction models) and the reference signature streams. An example implementation of the meter data analyzer 120 is described below in conjunction with FIG. 3.

The example reference database 130 of the illustrated example of FIG. 1 includes generated reference signatures created or otherwise obtained by the example data center 115. In some examples, the media monitoring entity associated with the reference database 130 can directly monitor media source feeds to generate reference signatures. Additionally or alternatively, the media monitoring entity associated with the reference database 130 can generate reference signatures from downloaded reference media, etc. In some examples, each reference signature stored in the reference database 130 is associated with a reference signature stream representative of a particular reference media, such as, but not limited to, an episode of a television series, a movie, an advertisement, etc. In some examples, each reference signature stored in the reference database 130 is associated with a timestamp, which indicates a time each reference signature was generated for the reference media. In some examples, the reference database 130 can include a library (e.g., database, table, etc.) of reference signature streams.

The example media creditor 140 of the illustrated example of FIG. 1 uses identification data from the example meter data analyzer 120 to credit the media exposure to user(s) associated with the media meter 105. In some examples, the identification data includes associations between the media monitoring data and particular reference media. In some examples, the media creditor 140 generates a report including data metrics regarding media exposure events that may be presented to media providers.

Figure 2:
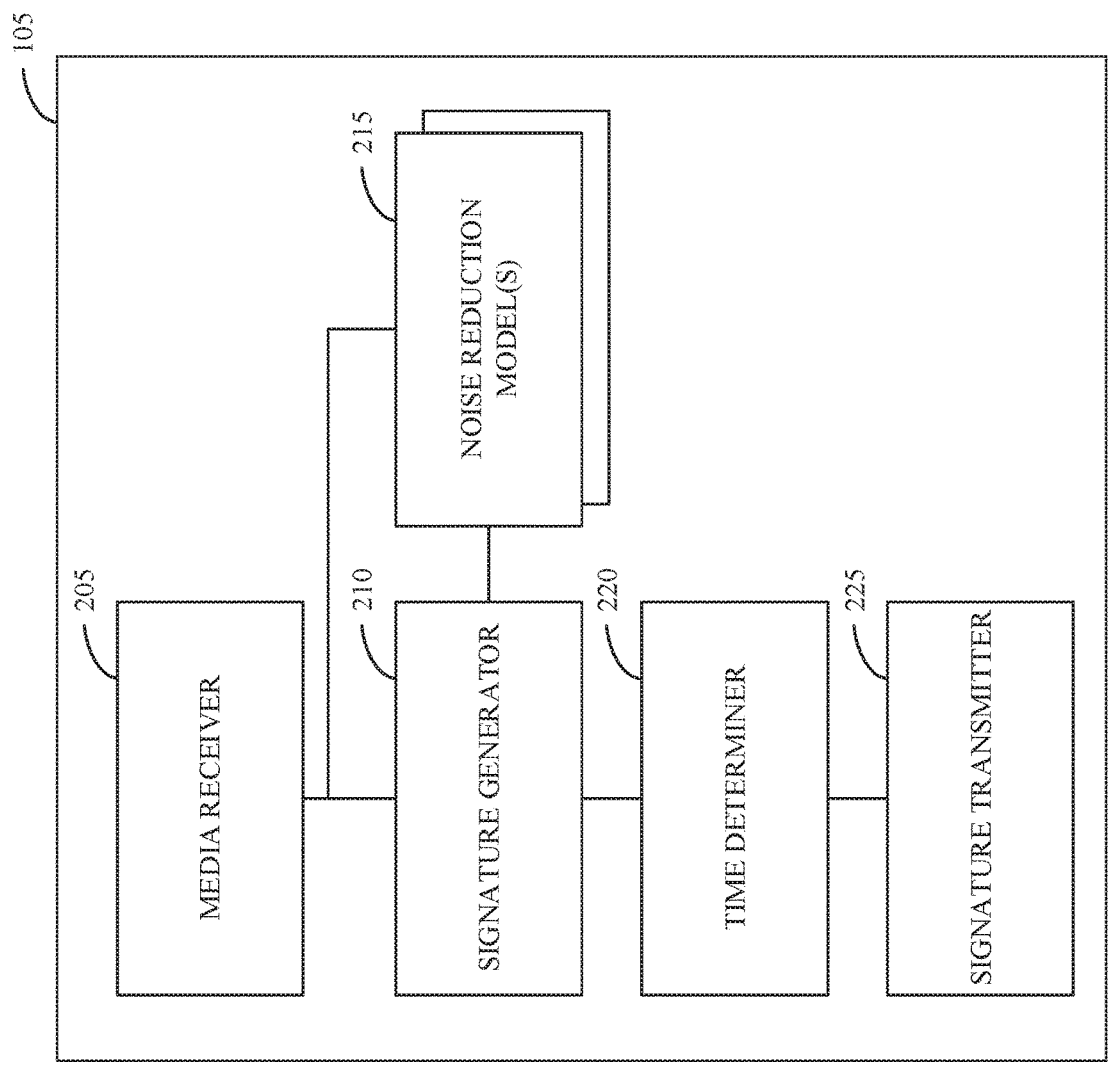
FIG. 2 is a block diagram of an example implementation of a media meter included in the example environment of FIG. 1.

FIG. 2 is a block diagram of an example implementation of the example media meter 105 included in the example environment of FIG. 1. The example media meter 105 includes an example media receiver 205, an example signature generator 210, example noise reduction model(s) 215, an example time determiner 220, and an example signature transmitter 225.

The example media receiver 205 of the illustrated example of FIG. 2 collects audio data from the media device. In some examples, the media receiver 205 collects the audio data from the media device using a microphone, however, other methods of collecting audio data may additionally and/or alternatively be used.

The example signature generator 210 generates monitored media signature streams from the audio data collected by the example media receiver 205. The signature generator 210 generates a monitored media signature stream from a baseline version of the audio data, also referred to herein as the baseline audio data. In some examples disclosed herein, the baseline audio data corresponds to the raw audio data collected from the media device and that has not been modified by one or more noise reduction models 215 (e.g., but which may or may not be otherwise enhanced, amplified, filtered, etc., to yield useful audio data). In some examples disclosed herein, the baseline audio data corresponds to the modified audio data that has been processed with a first noise reduction model, or a first combination of noise reduction models, from a collection of available noise reduction models 215. In some examples, the signature generator 210 generates other monitored media signature stream(s) by applying one or more of the example noise reduction models 215 on the raw audio data of the media collected by the media receiver 205 to yield one or more modified versions of the audio data (e.g. one or more modified audio data streams) different from the baseline audio, and then generating signature stream(s) from such modified version(s) of the audio data.

In some examples the noise reduction model(s) 215 include different models for filtering out different types of noise interference that could be present in raw audio data. For example, one noise reduction model may operate well to filter out household conversations from the monitored media data, and another noise reduction model may operate well to filter out common appliance noises (e.g., vacuums, etc.). The example signature generator 210 generates modified versions of the raw audio data by applying the different noise reduction model(s) 215. The example signature generator 210 generates monitored media signature stream(s) from the modified versions of the raw audio data.

The example time determiner 220 of the illustrated example of FIG. 2 determines the timestamp that the audio data of the media was collected by the example media receiver 205. In some examples, the time determiner 220 determines the local time of the media meter 105 to determine the timestamp of the audio data collection. In some examples, the time determiner 220 includes an internal clock that determines the timestamp of the audio data collection. The example time determiner 220 associates the timestamp with the monitored media signature streams generated by the signature generator 210. In the illustrated example of FIG. 2, the signature transmitter 225 transmits the monitored media signature streams with the associated timestamps determined by the time determiner 220 during the time interval that the monitored media signature stream(s) were generated. In some examples, the signature transmitter 225 includes the monitored media signature streams and the associated timestamps in monitoring data. In some examples, the signature transmitter 225 transmits the monitoring data to the example network 110 of FIG. 1.

Figure 3:
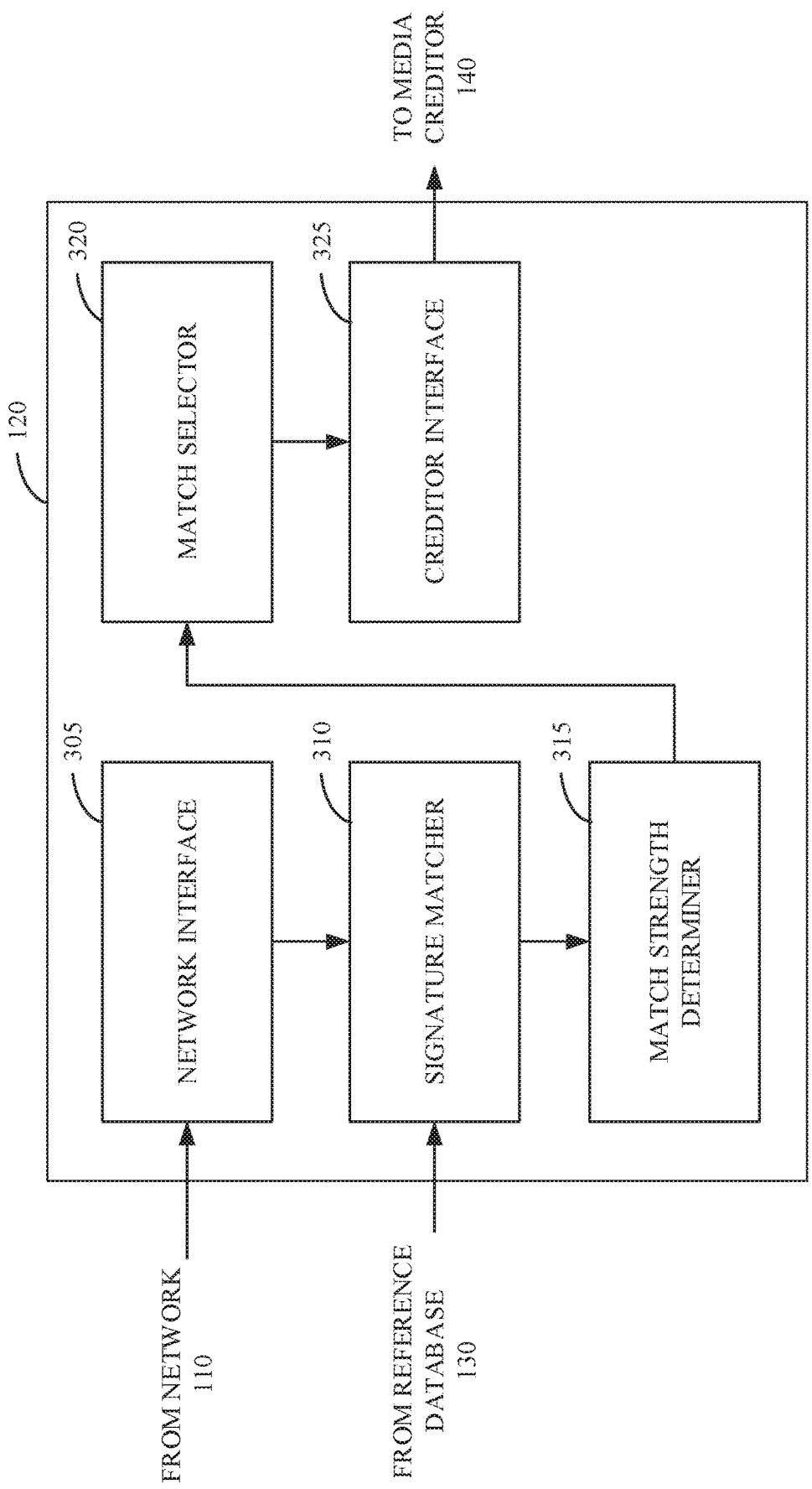
FIG. 3 is a block diagram of an example implementation of a meter data analyzer included in the example environment of FIG. 1.

FIG. 3 is a block diagram of an example implementation of the example meter data analyzer 120 included in the example environment of FIG. 1. The meter data analyzer 120 includes an example network interface 305, an example signature matcher 310, an example match strength determiner 315, an example match selector 320, and an example creditor interface 325.

The example network interface 305 of the illustrated example FIG. 3 allows the example meter data analyzer 120 of FIG. 1 to receive the monitoring data from the example network 110. In some examples, the network interface 305 can convert the monitoring data into a format readable by the meter data analyzer 120. In some examples, the network interface 305 can be in continuous communication with the network 110 and/or the media meter 105. In some examples, the network interface 305 can be in intermittent (e.g., periodic or aperiodic) communication with the network 110 and/or the media meter 105. In some examples, the network interface 305 can be absent. In such examples, the media meter 105 can be in direct communication with the meter data analyzer 120. For example, if the example meter data analyzer 120 is implemented via a cloud service, the media meter 105 can upload the monitoring data directly to the cloud service. In some examples, the network interface 305 obtains monitored media signature streams and associated timestamps from the monitoring data.

The example signature matcher 310 of the illustrated example of FIG. 2 performs signature matching between the monitored media signature streams and the reference signature streams in the example reference database 130. For example, the signature matcher 310 identifies if each monitored media signature stream matches any reference signature streams stored in the reference database 130. In some examples disclosed herein, the signature matcher 310 may perform matching using any suitable means (e.g., linear matching, hashed matching, etc.). In some examples, the signature matcher 310 performs signature matching for a monitored media signature stream generated from the baseline audio data (e.g., raw audio data) captured by the media meter 105, and for other monitored media signature stream(s) generated from modified audio data, different from the baseline audio data, which was obtained at the media meter 105 using the noise reduction model(s) 215 of FIG. 2. In such examples, the signature matcher 310 identifies matching reference signature streams for each of the monitored media signature streams (e.g., baseline and modified) included in the monitoring data. In some examples, the signature matcher 310 identifies the source identifiers of the identified matching reference signature streams, wherein the source identifiers identify the reference media, identify the source of the reference media (e.g., a specific broadcasting station, etc.), etc.

The example match strength determiner 315 determines the strengths of the signature matches for each of the monitored media signature streams (e.g., baseline and modified). In examples disclosed herein, the strength of a signature match is based on the number of individual signature matches that occur between the plurality of signatures included in the monitored media signature stream and the plurality of signatures included in the reference signature stream. For example, a strong match can correspond to relatively high number of individual signature matches (e.g., five signature matches, ten signature matches, etc.) and a weak match can correspond to relatively low number of individual signature matches in a period of time (e.g., one signature match, etc.). However, any other suitable number of individual signature matches between the monitored media signature stream and the reference signature stream can correspond to strong matching. In some examples, the signature match strength can be represented on a scale of strength (e.g., from 0 to 500 where 0 is a weak match and 500 is a strong match, etc.). In such examples, the signature match strength is factored into the scale of strength based on the number of individual signature matches between the monitored media signature stream and the reference signature stream.

The example match selector 320 determines a consensus signature match for the media based on the respective signature matches for each of the monitored media signature streams (e.g., baseline and modified). The example match selector 320 compares the source identifiers of the signature matches for each of the monitored media signature streams. In some examples, the match selector 320 determines if the source identifiers of each of the signature matches match each other (e.g., are the same). For example, the match selector 320 determines if all of the signature matches include the same source identifier. If the match selector 320 determines that the signature matches have matching source identifiers, then the match selector 320 identifies the matching source identifier as the signature match for the media.

If the match selector 320 determines that the signature matches for the different monitored media signature streams do not have matching source identifiers, the match selector 320 determines if the signature match strengths meet a threshold. In some examples, the threshold identifies strong signature matches. In some examples, the threshold can be a value on the strength scale. For example, for a scale of 0 to 500, the threshold can be 300. The match selector 320 determines if at least one of the signature match strengths for at least one of the corresponding monitored media signature streams (e.g., baseline and/or modified) meets or exceeds the threshold. If the match selector 320 determines that none of the signature match strengths meets or exceeds the threshold, the match selector 320 identifies that there is no consensus signature match found from the different signature matches. If the match selector 320 determines that at least one of the signature match strengths meets or exceeds the threshold, then the match selector 320 determines if multiple signature match strengths meet or exceed the threshold. If the match selector 320 determines that only one signature match strength meets or exceeds the threshold, then the match selector 320 identifies the source identifier of the consensus signature match from the signature match that had the signature match strength that meets or exceeds the threshold.

If the match selector 320 determines that multiple signature match strengths meet or exceed the threshold, the match selector 320 compares the signature match strengths to each other. The match selector 320 identifies the consensus signature match from the signature matches that include signature match strengths that meet or exceed the threshold. In some examples, the match selector 320 identifies the consensus signature match as the signature match that includes the strongest signature match strength (e.g., the signature match strength with the highest value on the strength scale, etc.) compared to the other signature match strengths that meet or exceed the threshold.

However, the match selector 320 can determine a consensus signature match using other methods. For example, the match selector 320 can determine a consensus signature match based on if a majority of signature matches determined for the corresponding monitored media signature streams (e.g., baseline and/or modified) identify the same source identifier (e.g., if three out of five signature matches have a matching source identifier). The match selector 320 can also determine a consensus signature match based on a weighted signature match strength. For example, if one signature match for a first one of the monitored media signature streams (e.g., baseline or modified) identified a first source identifier with a strong signature match strength but three other signature matches for three other of the monitored media signature streams (e.g., baseline and/or modified) identified a second source identifier with weaker signature match strengths, the match selector 320 could determine a consensus signature match based on weighting (combining) the weaker signature match strengths associated with the second source identifier and comparing its weighted signature match strength to the signature match strength associated with the first source identifier. Other example methods for identifying the consensus signature match may additionally and/or alternatively be used.

In the illustrated example of FIG. 3, the example creditor interface 325 determines if a consensus signature match was found by the match selector 320. If the creditor interface 325 determines that a consensus signature match was found, the creditor interface 325 credits the media exposure to the source identifier of the consensus signature match. In some examples, the source identifier of the consensus signature match is the source identifier of a matching reference signature stream corresponding to reference media. If the creditor interface 325 determines that no consensus signature match was found, the creditor interface 325 does not credit the media exposure. The example creditor interface 325 generates identification data for the consensus signature match based on the output of the match selector 320. In some examples, the creditor interface 325 transmits the identification data to the media creditor 140 of FIG. 1.

In the illustrated examples of FIGS. 4A, 4B, 5A, and 5B, each row of the example matching results 400, 405, 410, 500, 505, and 510 represent the matching results returned by the example match strength determiner 315 for successive monitored signature packets retrieved by the example network interface 305. In the illustrated examples, each row of the example outputs 415 and 515 represent the output matching results returned by the example match selector 320 for successive monitored signature packets retrieved by the example network interface 305. In the illustrated examples, each monitored media signature packet (labeled as QPKT) has a numeric identifier and corresponds to a stream of monitored media signatures representing a media duration of approximately 2 seconds. As such, the example matching results 400, 405, 410, 500, 505, and 510 and the example outputs 415 and 515 have a time resolution of approximately 2 seconds, with each matching result identifying the particular reference source determined to match the corresponding monitored media signature packet. In the example matching results 400, 405, 410, 500, 505, and 510 and the outputs 415 and 515, the matching reference source is identified by a source identifier (SID) and a reference timestamp (TS) corresponding to the time when the matching reference media was generated and added to the reference database 130. The example matching results 400, 405, 410, 500, 505, and 510 also list the signature match strength (STRG) between the monitored media signatures of the monitored media signature packet and the best matching reference signatures from the reference database 130.

FIG. 4A illustrates example matching results 400, 405, and 410 for a stream of monitored signature packets using the meter data analyzer 120 of FIG. 3. In the illustrated examples, the matching results 400, 405, and 410 represent the results from the example signature matcher 310 and the example match strength determiner 315 of the meter data analyzer 120. The example matching results 400, 405, and 410 represent the matching results from the comparison of the different example monitored media signature streams from the example media meter 105 to reference signature streams from the example reference database 130. In the illustrated example of FIG. 4A, the matching results 400 represent matching results for monitored media signature streams generated from baseline audio data (e.g., raw audio data), the matching results 405 represent matching results for monitored media signature streams generated from a first noise reduction model, and the matching results 410 represent matching results for monitored media signature stream generated from a second noise reduction model. FIG. 4A illustrates an example situation where the environment of the media meter 105 includes ambient noise (e.g., a dog barking in the household) during a portion of the collection of media monitoring information. In the illustrated example, the ambient noise was during the time frame that the monitored media signature QPKTs 430-434 were generated. The example matching results 400, 405, and 410 illustrate the matching performance for each of the different monitored media signature streams generated from the audio data collected by the media meter 105.

FIG. 4B illustrates an example output 415 of the matching results of FIG. 4A using the match selector 320 of the meter data analyzer 120 of FIG. 3. The illustrated example of FIG. 4B represents the example output 415 from the comparison of the matching results 400, 405, and 410 of FIG. 4A. In the illustrated examples, the match selector 320 compares the SID and STRG between the matching results 400, 405, and 410 for each of the QPKTs to determine the consensus match to include in the output 415. For example, the match selector 320 compares each of the QPKTs 426-429 for the matching results 400, 405, and 410, and the match selector 320 determines that the matching results 400, 405, and 410 all identify the SID 4000. In this example, the match selector 320 determines that all of the matching results 400, 405, and 410 have matching SIDs, and the match selector 320 identifies the SID 4000 as the consensus match for the QPKTs 426-429 in the example output 415.

For the QPKTs 430 and 431 of FIGS. 4A and 4B, the match selector 320 compares the matching results 400, 405, and 410 and determines that only matching results 405 and 410 identified matching reference signature streams. The match selector 320 determines if the matching results 405 and 410 have signature match strengths (STRG) that meet a threshold. In the illustrated examples, the threshold is 300. However, the threshold can be any value. For the QPKTs 430 and 431, only the matching results 405 meet the threshold. The match selector 320 identifies the SID of the matching results 405 for both the QPKTs 430 and 431 (e.g., SID 4000) as the consensus match in the example output 415. For the QPKTs 432-434, the match selector 320 compares the matching results 400, 405, and 410 and determines that only matching results 405 identified matching reference signature streams for those QPKTs. The match selector 320 determines that the matching results 405 have signature match strengths for each of the QPKTs 432-434 that meet the threshold. The match selector 320 identifies the SID of the matching results 405 for the QPKTs 432-434 (e.g., SID 4000) as the consensus match in the example output 415.

Finally, for QPKTs 435-440, the match selector 320 determines that each of the matching results 400, 405, and 410 identified matching reference signature streams. The matching results 400 and 405 both identified the reference signature streams corresponding to SID 4000, and matching results 410 identified the reference signature streams corresponding to SID 6000. Since the matching results 400, 405, and 410 do not all match, the match selector 320 compares the signature match strengths (STRG) against the threshold. For QPKTs 435 and 439, only matching results 405 had signature match strengths that meets the threshold, and the match selector 320 identifies the SID of the matching results 405 for the QPKTs 435 and 439 (e.g., SID 4000) as the consensus match in the example output 415. For QPKTs 436-438 and 440, both the matching results 400 and the matching results 405 meet the threshold. The match selector 320 compares the STRG between the matching results 400 and 405 to determine which signature match strength is stronger. For the QPKTs 436-438 and 440, the matching results 405 have the larger STRG. The match selector 320 identifies the SID of the matching results 405 for the QPKTs 436-438 and 440 (e.g., SID 4000) as the consensus match in the example output 415.

In some examples, the match selector 320 identifies a consensus match based on a majority of the matching results 400, 405, and 410. For example, in the illustrated examples of FIGS. 4A and 4B, the match selector 320 identifies the consensus matches for QPKTs 435-440 based on the majority matching results in the matching results 400, 405, and 410. The match selector 320 compares the matching results 400, 405, and 410 for the QPKTs 435-440, and the match selector 320 determines both matching results 400 and 405 identify the SID 4000 for QPKTs 435-440 and matching results 410 identifies the SID 6000 for QPKTs 435-440. The match selector 320 determines that the majority of the matching results (e.g., matching results 400 and 405) identify the SID 4000 for QPKTs 435-440. The match selector 320 identifies the SID (e.g., SID 4000) of the majority of the matching results (e.g., matching results 400 and 405) for the QPKTs 435-440 as the consensus match in the example output 415.

In some examples, the match selector 320 identifies a consensus match based on weighted signature match strengths of the matching results 400, 405, and 410. For example, in the illustrated examples of FIGS. 4A and 4B, the match selector 320 identifies the consensus matches for QPKTs 435-440 based on weighting the signature match strengths for a majority of the matching results in the matching results 400, 405, and 410. The match selector 320 compares the matching results 400, 405, and 410 for the QPKTs 435-440, and the match selector 320 determines both matching results 400 and 405 identify the SID 4000 for QPKTs 435-440 and matching results 410 identifies the SID 6000 for QPKTs 435-440. The match selector 320 determines the signature match strengths for the matching results 400 and 405 for the QPKTs 435-440 and weights (combines) the signature match strengths. The match selector 320 compares the weighted signature match strengths from the matching results 400 and 405 for QPKTs 435-440 to the signature match strengths from the matching results 410 for QPKTs 435-440. The match selector 320 determines the weighted signature match strengths from the matching results 400 and 405 for QPKTs 435-440 are stronger (higher) than the signature match strengths from the matching results 410. The match selector 320 identifies the SID (e.g., SID 4000) of the matching results 400 and 405 for the QPKTs 435-440 as the consensus match in the example output 415.

In the illustrated examples of FIGS. 4A and 4B, the matching results 405 were determined to identify the SID of the signature matches output for all of the QPKTs by the example match selector 320. In the illustrated examples, the first noise reduction model that was used in the generation of the monitored media signature streams of the matching results 405 performed well for the example ambient noise present in the audio data. However, in other examples of ambient noise, the matching results 400 and 410 could perform better than the matching results 405. Additionally, in the illustrated examples, the match selector 320 determines a consensus signature match for individual QPKTs. However, the match selector 320 can determine consensus signature matches for groups of QPKTs at a time (e.g., the match selector 320 can evaluate a group of QPKTs and determine a consensus signature match for that group).

FIG. 5A illustrates alternative example matching results 500, 505, and 510 for a stream of monitored signature packets using the meter data analyzer 120 of FIG. 3. In the illustrated examples, the matching results 500, 505, and 510 represent the results from the example signature matcher 310 and the example match strength determiner 315 of the meter data analyzer 120. The example matching results 500, 505, and 510 represent the matching results from the comparison of the different example monitored media signature streams from the example media meter 105 to reference signature streams from the example reference database 130. In the illustrated example of FIG. 5A, the matching results 500 represent matching results for monitored media signature streams generated from baseline audio data (e.g., raw audio data), the matching results 505 represent matching results for monitored media signature streams generated from a first noise reduction model, and the matching results 510 represent matching results for monitored media signature stream generated from a second noise reduction model. FIG. 5A illustrates an example situation where the environment of the media meter 105 does not include any ambient noise during the collection of media monitoring information. The example matching results 500, 505, and 510 illustrate the matching performance for each of the different monitored media signature streams generated from the audio data collected by the media meter 105.

FIG. 5B illustrates an example output 515 of the matching results of FIG. 5A using the match selector 320 of the meter data analyzer 120 of FIG. 3. The illustrated example of FIG. 5B represents the example output 515 from the comparison of the matching results 500, 505, and 510 of FIG. 5A. In the illustrated examples, the match selector 320 compares the SID and STRG between the matching results 500, 505, and 510 for each of the QPKTs to determine the consensus match to include in the output 515. For example, the match selector 320 compares each of the QPKTs 526-528 for the matching results 500, 505, and 510, and the match selector 320 determines that the matching results 500, 505, and 510 all identify the SID 4000. In this example, the match selector 320 determines that all of the matching results 500, 505, and 510 have matching SIDs, and the match selector 320 identifies the SID 4000 as the consensus match for the QPKTs 526-528 in the example output 515.

For the QPKTs 529-531 and 533 of FIGS. 5A and 5B, the match selector 320 compares the matching results 500, 505, and 510 and determines each of the matching results 500, 505, and 510 identified matching reference signature streams. The matching results 500 and 510 both identified the reference signature streams corresponding to SID 4000, and matching results 505 identified the reference signature streams corresponding to SID 7000 for QPKTs 529-531 and SID 8000 for QPKT 533. Since the matching results 500, 505, and 510 do not all match, the match selector 320 compares the signature match strengths (STRG) against the threshold. In the illustrated examples, the threshold is 300. However, the threshold can be any value. For QPKTs 529-531 and 533, only matching results 500 have signature match strengths that meet the threshold, and the match selector 320 identifies the SID of the matching results 500 for the QPKTs 529-531 and 533 (e.g., SID 4000) as the consensus match in the example output 515.

In some examples, the match selector 320 identifies a consensus match based on a majority of the matching results 500, 505, and 510. For example, in the illustrated examples of FIGS. 5A and 5B, the match selector 320 identifies the consensus matches for QPKTs 529-531 and 533 based on the majority matching results in the matching results 500, 505, and 510. The match selector 320 compares the matching results 500, 505, and 510 for the QPKTs 529-531 and 533, and the match selector 320 determines both matching results 500 and 510 identify the SID 4000 for QPKTs 529-531 and 533 and matching results 505 identifies the SID 7000 for QPKTs 529-531 and the SID 8000 for QPKT 533. The match selector 320 determines that the majority of the matching results (e.g., matching results 500 and 510) identify the SID 4000 for QPKTs 529-531 and 533. The match selector 320 identifies the SID (e.g., SID 4000) of the majority of the matching results (e.g., matching results 500 and 510) for the QPKTs 529-531 and 533 as the consensus match in the example output 515.

In some examples, the match selector 320 identifies a consensus match based on weighted signature match strengths of the matching results 500, 505, and 510. For example, in the illustrated examples of FIGS. 5A and 5B, the match selector 320 identifies the consensus matches for QPKTs 529-531 and 533 based on weighting the signature match strengths for a majority of the matching results in the matching results 500, 505, and 510. The match selector 320 compares the matching results 500, 505, and 510 for the QPKTs 529-531 and 533, and the match selector 320 determines both matching results 500 and 510 identify the SID 4000 for 529-531 and 533 and matching results 505 identifies the SID 7000 for QPKTs 529-531 and the SID 8000 for QPKT 533. The match selector 320 determines the signature match strengths for the matching results 500 and 510 for the QPKTs 529-531 and 533 and weights (combines) the signature match strengths. The match selector 320 compares the weighted signature match strengths from the matching results 500 and 510 for QPKTs 529-531 and 533 to the signature match strengths from the matching results 505 for QPKTs 529-531 and 533. The match selector 320 determines the weighted signature match strengths from the matching results 500 and 510 for QPKTs 529-531 and 533 are stronger (higher) than the signature match strengths from the matching results 505. The match selector 320 identifies the SID (e.g., SID 4000) of the matching results 500 and 510 for the QPKTs 529-531 and 533 as the consensus match in the example output 515.

For QPKTs 532 and 534, the match selector 320 determines that only matching results 500 and 510 identified matching reference signature streams. The match selector 320 determines if the matching results 500 and 510 have signature match strengths (STRG) that meet the threshold. For the QPKTs 532 and 534, only the matching results 500 meet the threshold. The match selector 320 identifies the SID of the matching results 500 for both the QPKTs 532 and 534 (e.g., SID 4000) as the consensus match in the example output 515. Finally, for QPKTs 535-540, the match selector 320 determines that the matching results 500, 505, and 510 all identify the SID 4000. In this example, the match selector 320 determines that all of the matching results 500, 505, and 510 have matching SIDs, and the match selector 320 identifies the SID 4000 as the consensus match for the QPKTs 535-540 in the example output 515.

In the illustrated examples of FIGS. 5A and 5B, the matching results 500 were determined to identify the SID of the signature matches output for all of the QPKTs by the example match selector 320. In the illustrated examples, the baseline audio data (e.g., raw audio data) that was used in the generation of the monitored media signature streams of the matching results 500 performed well for the example audio data from the environment that does not include any ambient noise during the collection of media monitoring information. However, in other examples of different audio data, the matching results 505 and 510 could perform better than the matching results 500. Additionally, in the illustrated examples, the match selector 320 determines a consensus signature match for individual QPKTs. However, the match selector 320 can determine consensus signature matches for groups of QPKTs at a time (e.g., the match selector 320 can evaluate a range of QPKTs and determine a consensus signature match for that group).

While an example manner of implementing the media meter 105 of FIG. 1 is illustrated in FIG. 2, one or more of the elements, processes and/or devices illustrated in FIG. 2 may be combined, divided, re-arranged, omitted, eliminated and/or implemented in any other way. Further, the media receiver 205, the example signature generator 210, the example noise reduction model(s) 215, the example time determiner 220, the example signature transmitter 225 and/or, more generally, the example media meter 105 of FIG. 2 may be implemented by hardware, software, firmware and/or any combination of hardware, software and/or firmware. Thus, for example, any of the example media receiver 205, the example signature generator 210, the example noise reduction model(s) 215, the example time determiner 220, the example signature transmitter 225 and/or, more generally, the example media meter 105 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media receiver 205, the example signature generator 210, the example noise reduction model(s) 215, the example time determiner 220, and/or the example signature transmitter 225 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media meter 105 of FIG. 2 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
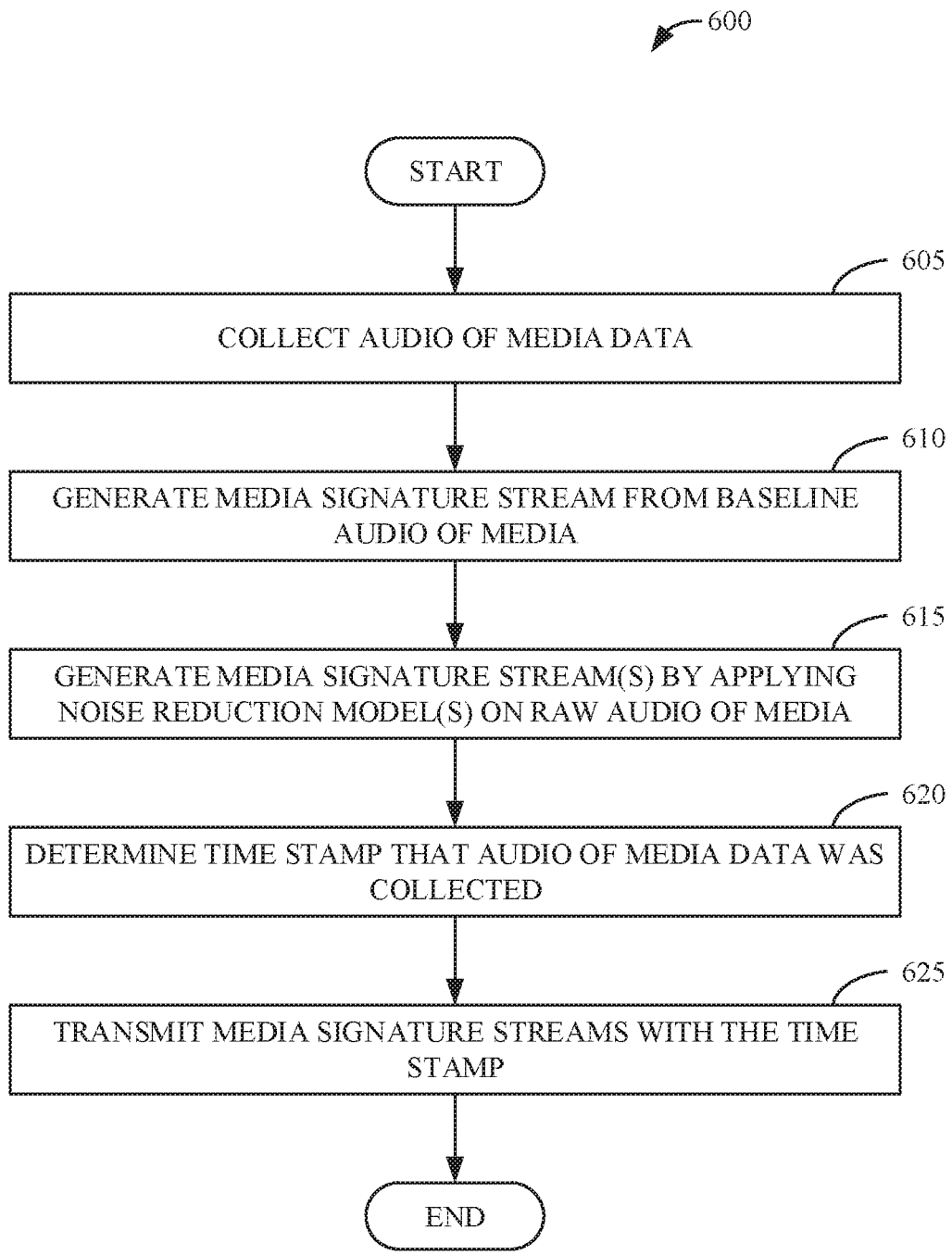
FIG. 6 is a flowchart representative of machine readable instructions which may be executed to implement the media meter of FIGS. 1 and/or 2.

A flowchart representative of example hardware logic, machine readable instructions, hardware implemented state machines, and/or any combination thereof for implementing the media meter 105 of FIG. 2 is shown in FIG. 6. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 6, many other methods of implementing the example media meter 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

While an example manner of implementing the meter data analyzer 120 of FIG. 1 is illustrated in FIG. 3, one or more of the elements, processes and/or devices illustrated in FIG. 3 may be combined, divided, re-arranged, omitted, eliminated and/or implemented in any other way. Further, the example network interface 305, the example signature matcher 310, the example match strength determiner 315, the example match selector 320, the example creditor interface 325 and/or, more generally, the example meter data analyzer 120 of FIG. 3 may be implemented by hardware, software, firmware and/or any combination of hardware, software and/or firmware. Thus, for example, any of the example network interface 305, the example signature matcher 310, the example match strength determiner 315, the example match selector 320, the example creditor interface 325 and/or, more generally, the example meter data analyzer 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 305, the example signature matcher 310, the example match strength determiner 315, the example match selector 320, and/or the example creditor interface 325 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 120 of FIG. 3 may include one or more elements, processes and/or devices in addition to, or instead of, those illustrated in FIGS. 7 and 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
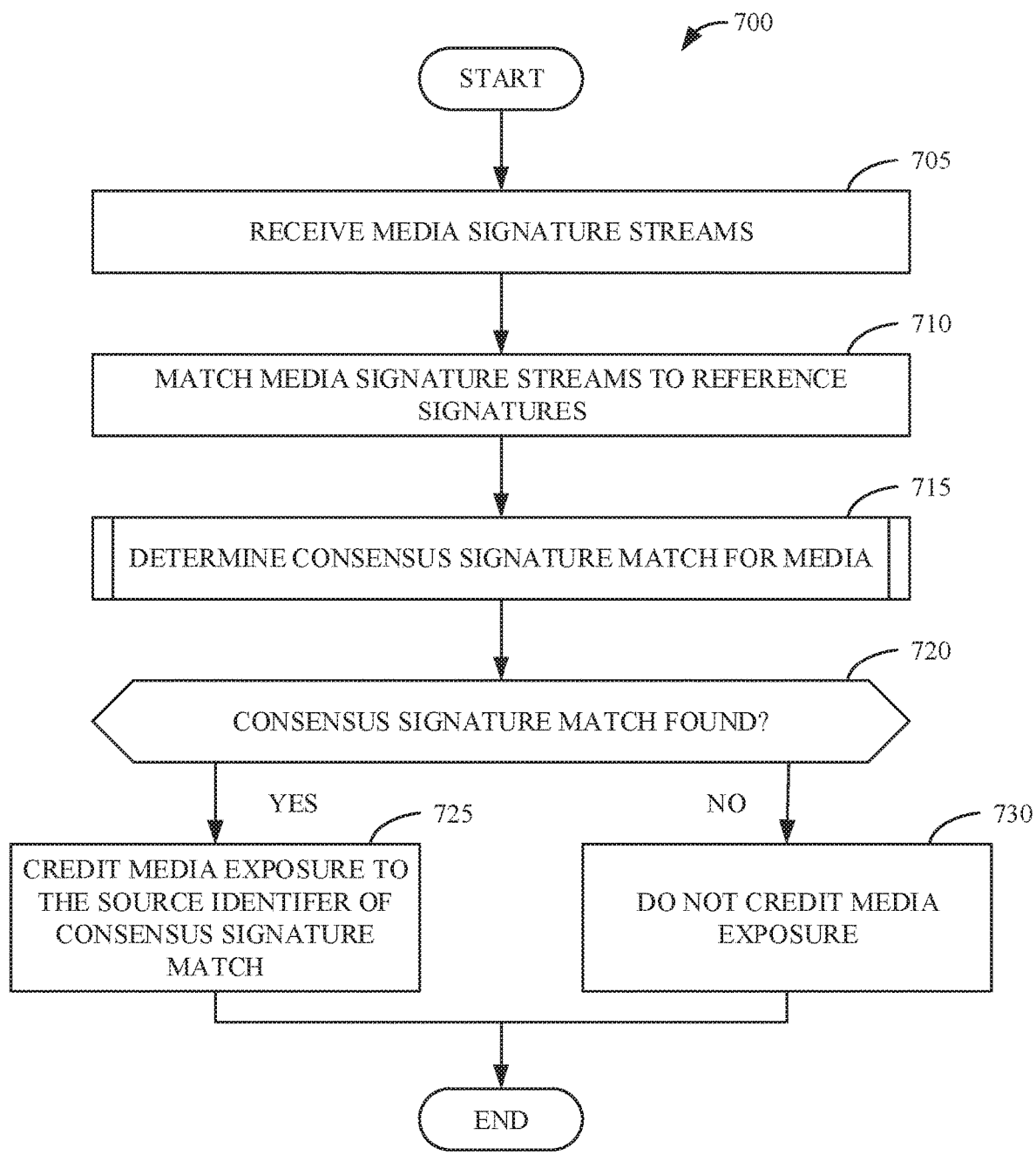
FIG. 7 is a flowchart representative of machine readable instructions which may be executed to implement the meter data analyzer of FIGS. 1 and/or 3.
Figure 8:
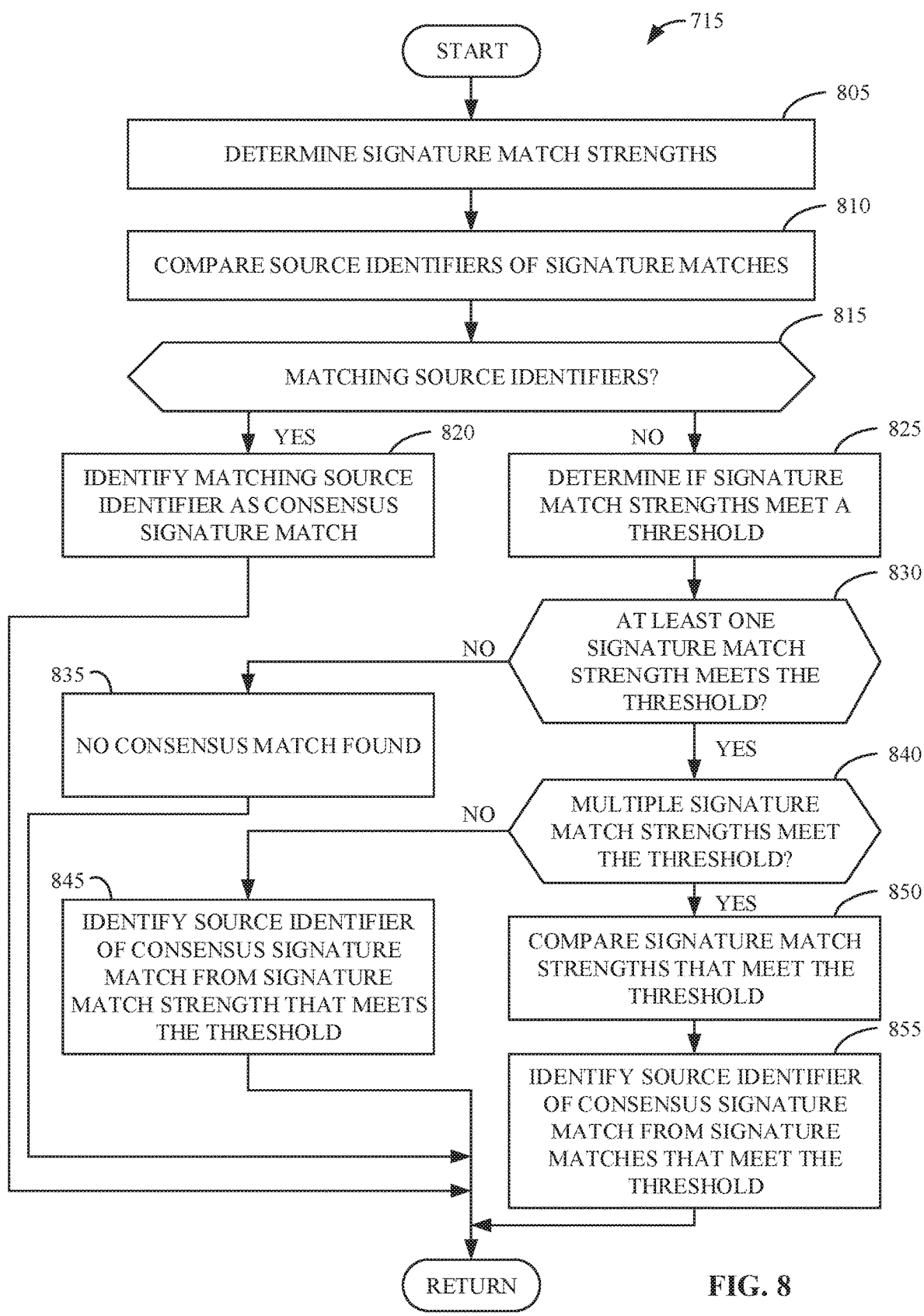
FIG. 8 is flowchart representative of machine readable instructions which may be executed to an example match strength determiner and an example match selector included in the meter data analyzer of FIGS. 1 and/or 3.

Flowcharts representative of example hardware logic, machine readable instructions, hardware implemented state machines, and/or any combination thereof for implementing the meter data analyzer 120 of FIG. 3 are shown in FIGS. 7 and 8. The machine readable instructions may be one or more executable programs or portion(s) of an executable program for execution by a computer processor and/or processor circuitry, such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program(s) is (are) described with reference to the flowchart illustrated in FIGS. 7-8, many other methods of implementing the example meter data analyzer 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6, 7 and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of machine readable instructions which may be executed to implement the media meter 105 of FIG. 2. The program 600 of FIG. 6 begins execution at block 605 at which the example media receiver 205 collects the audio of the monitored media data. The example media receiver 205 of the illustrated example of FIG. 2 collects audio data from the media device. In some examples, the media receiver 205 collects the audio data from the media device using a microphone, however, other methods of collecting audio data may additionally and/or alternatively be used.

At block 610, the example signature generator 210 generates a monitored media signature stream from baseline audio data corresponding to the media. In the illustrated example, the signature generator 210 generates a monitored media signature stream from baseline audio data collected from the media device. In some examples, the baseline audio data corresponds to the raw audio data collected from the media device (e.g., but which may or may not be otherwise enhanced, amplified, filtered, etc.). In some examples disclosed herein, the baseline audio data corresponds to the modified audio data that has been processed with a first noise reduction model, or a first combination of noise reduction models, from a collection of available noise reduction models 215.

At block 615, the example signature generator 210 generates other monitored media signature stream(s) by applying one or more of the noise reduction model(s) on the raw audio of the media to yield one or more modified versions of the audio data (e.g. one or more modified audio data streams) different from the baseline audio, and then generating signature stream(s) from such modified version(s) of the audio data. In some examples, the signature generator 210 generates the other monitored media signature stream(s) by applying one or more of the example noise reduction models 215 on the raw audio data of the media collected by the media receiver 205 to yield the one or more modified versions of the audio data (e.g. the one or more modified audio data streams) different from the baseline audio, and then generating signature stream(s) from such modified version(s) of the audio data. In some examples the noise reduction model(s) 215 include different models for filtering out common noise interferences present in raw audio data. For example, one noise reduction model may operate well to filter out household conversations from the monitored media data, and another noise reduction model may operate well to filter out common appliance noises (e.g., vacuums, etc.).

At block 620, the example time determiner 220 determines the timestamp that the audio of the monitored media data was collected by the media receiver 205. In some examples, the time determiner 220 determines the local time of the media meter 105 to determine the timestamp of the audio data collection. In some examples, the time determiner 220 includes an internal clock that determines the timestamp of the audio data collection. The example time determiner 220 associates the timestamps with the monitored media signature streams generated by the signature generator 210.

At block 625, the example signature transmitter 225 transmits the monitored media signature streams with the timestamps. The signature transmitter 225 transmits the monitored media signature streams with the associated timestamps determined by the time determiner 220 during the time interval that the monitored media signature streams were generated. In some examples, the signature transmitter 225 includes the monitored media signature streams and the associated timestamps in monitoring data. In some examples, the signature transmitter 225 transmits the monitoring data to the example network 110 of FIG. 1. Once the signature transmitter 225 transmits the monitored media signature streams with the timestamp, process 600 ends.

FIG. 7 is a flowchart representative of machine readable instructions which may be executed to implement the meter data analyzer 120 of FIG. 3. The program 700 of FIG. 7 begins execution at block 705 at which the example network interface 305 receives the monitored media signature streams from the example network 110 of FIG. 1. In some examples, the network interface 305 receives the monitored media signature streams in the monitoring data. In some examples, the network interface 305 can convert the monitoring data into a format readable by the meter data analyzer 120. In some examples, the network interface 305 can be in continuous communication with the network 110 and/or the media meter 105. In other examples, the network interface 305 can be in intermittent (e.g., periodic or aperiodic) communication with the network 110 and/or the media meter 105. In some examples, the network interface 305 obtains monitored media signature streams and associated time stamps from the monitoring data.

At block 710, the example signature matcher 310 matches the different monitored media signature streams reported by the media meter 105 to reference signature streams. The different monitored media signature streams represent different versions of audio data obtained for the same monitored media, and the different versions of audio data can include raw audio data and/or audio data that was processed with one or more different noise reduction models or combinations of noise reduction models. The example signature matcher 310 of the illustrated example of FIG. 2 performs signature matching between the monitored media signature streams and the reference signature streams in the example reference database 130. For example, the signature matcher 310 identifies if each monitored media signature stream matches any reference signature streams stored in the reference database 130. In some examples disclosed herein, the signature matcher 310 may perform matching using any suitable means (e.g., linear matching, hashed matching, etc.). In some examples, the signature matcher 310 performs signature matching for a monitored media signature stream generated from baseline audio data (e.g., raw audio data) and for the monitored media signature stream(s) generated using the noise reduction model(s) 215 of FIG. 2. In such examples, the signature matcher 310 identifies matching reference signature streams for each of the monitored media signature streams included in the monitoring data. In some examples, the signature matcher 310 identifies the source identifiers of the identified reference signature streams, wherein the source identifiers are associated with the source of the media (e.g., a specific broadcasting station, etc.).

At block 715, the example match selector 320 determines a consensus signature match for the media. The match selector 320 determines the consensus signature match based on the signature matches for each of the monitored media signature streams. As described in further detail below, the example flowchart 715 of FIG. 8 represents example instructions that may be implemented to determine the consensus signature match.

At block 720, the example creditor interface 325 determines if a consensus signature match was found. If the example creditor interface 325 receives a consensus signature match from the match selector 320, then the creditor interface 325 determines that a consensus signature match was found. If the example creditor interface 325 does not receive a consensus signature match from the match selector 320, then the creditor interface 325 determines that a consensus signature match was not found. If the example creditor interface 325 determines that a consensus signature match was found, then process 700 continues to block 725 at which the example creditor interface 325 credits the media exposure to the source identifier of the consensus signature match. If the example creditor interface 325 determines that a consensus signature match was not found, then process 700 continues to block 730 at which the example creditor interface 325 does not credit the media exposure.

At block 725, the example creditor interface 325 credits the media exposure to the source identifier of the consensus signature match. In some examples, the creditor interface 325 generates identification data for the consensus signature match based on the output of the match selector 320. In such examples, the identification data includes the source identifier of the consensus signature match. In some examples, the creditor interface 325 transmits the identification data to the media creditor 140 of FIG. 1. Once the creditor interface 325 credits the media exposure to the source identifier of the consensus signature match, process 700 ends.

At block 730, the example creditor interface 325 does not credit the media exposure. In some examples, the creditor interface 325 does not transmit any identification data to the media creditor 140 of FIG. 1. Once the creditor interface 325 does not credit the media exposure, process 700 ends.

FIG. 8 is flowchart representative of machine readable instructions which may be executed to implement the example match strength determiner 315 and the example match selector 320 included in the meter data analyzer 120 of FIG. 3. The program 715 of FIG. 8 begins execution at block 805 at which the example match strength determiner 315 determines the signature match strengths. The match strength determiner 315 determines the signature match strengths for each of the monitored media signature streams. In examples disclosed herein, the strength of a signature match is based on the number of individual signature matches that occur between the plurality of signatures included in the monitored media signature stream and the plurality of signatures included in the reference signature stream. For example, a strong match can correspond to relatively high number of individual signature matches (e.g., five signature matches, ten signature matches, etc.) and a weak match can correspond to relatively low number of individual signature matches in a period of time (e.g., one signature match, etc.). However, any other suitable number of individual signature matches between the monitored media signature stream and the reference signature stream can correspond to strong matching. In some examples, the signature match strength can be represented on a scale of strength (e.g., from 0 to 500 where 0 is a weak match and 500 is a strong match, etc.). In such examples, the signature match strength is factored into the scale of strength based on the number of signature matches between the monitored media signature stream and the reference signature stream.

At block 810, the example match selector 320 compares the source identifiers of the signature matches. The match selector 320 compares the source identifiers of the signature matches for each of the monitored media signature streams. At block 815, the example match selector 320 determines if there are any matching source identifiers. In some examples, the match selector 320 determines if the source identifiers of each of the signature matches match each other. For example, the match selector 320 determines if all of the signature matches include the same source identifier. If the match selector 320 determines that the signature matches have matching source identifiers, then process 715 continues to block 820 at which the match selector 320 identifies the matching source identifier as the consensus signature match for the media. If the match selector 320 determines that the signature matches do not have matching source identifiers, then process 715 continues to block 825 at which the match selector 320 determines if the signature match strengths meet a threshold.

At block 820, the example match selector 320 identifies the matching source identifier as the consensus signature match. In some examples, the match selector 320 provides the matching source identifier to the example creditor interface 325. Once the example match selector identifies the matching source identifier as consensus signature match, process 715 completes and returns to process 700 of FIG. 7.

At block 825, the example match selector 320 determines if the signature match strengths meet a threshold. The example match selector 320 compares the signature match strengths for each monitored media signature stream against the threshold. In some examples, the threshold identifies strong signature matches. In some examples, the threshold can be a value on the strength scale. For example, for a scale of 0 to 500, the threshold can be 300. At block 830, the example match selector 320 determines if at least one signature match strength meets the threshold. If the match selector 320 determines that none of the signature match strengths meets or exceeds the threshold, then process 715 continues to block 835 at which the match selector 320 identifies that there is no consensus signature match found from the different signature matches. If the match selector 320 determines that at least one of the signature match strengths meets or exceeds the threshold, then process 715 continues to block 840 at which the match selector 320 determines if multiple signature match strengths meet or exceed the threshold.

At block 835, the example match selector 320 determines there is no consensus match found. In some examples, the match selector 320 does not provide any output to the example creditor interface 325. In some examples, the match selector 320 provides an error message (e.g., "No Match Found") to the example creditor interface 325. Once the example match selector determines there is no consensus match found, process 715 completes and returns to process 700 of FIG. 7.

At block 840, the example match selector 320 determines if there are multiple signature match strengths that meet the threshold. If the match selector 320 determines that only one signature match strength meets or exceeds the threshold, then process 715 continues to block 845 at which the match selector 320 identifies the source identifier of the consensus signature match from the signature match that had the signature match strength that meets or exceeds the threshold. If the match selector 320 determines that multiple signature match strengths meets or exceed the threshold, then process 715 continues to block 850 at which the match selector 320 compares the signature match strengths to each other.

At block 845, the example match selector 320 identifies the source identifier of consensus match from the signature match strength(s) that meets the threshold. In some examples, the match selector 320 provides the source identifier of the consensus match to the example creditor interface 325. Once the example match selector identifies the source identifier of consensus match from the signature match strength that meets the threshold, process 715 completes and returns to process 700 of FIG. 7.

At block 850, the example match selector 320 compares the signature match strengths that meet the threshold. At block 855, the example match selector 320 identifies the source identifier of the consensus signature match from the signature matches that meet the threshold. In some examples, the match selector 320 identifies the consensus signature match based on the comparison of the signature match strengths. The match selector 320 identifies the consensus signature match from the signature matches that include signature match strengths that meet or exceed the threshold. In some examples, the match selector 320 identifies the consensus signature match as the signature match that includes the strongest signature match strength (e.g., the signature match strength with the highest value on the strength scale, etc.) compared to the other signature match strengths that meet or exceed the threshold. In some examples, the match selector 320 identifies the consensus signature match based on if a majority of signature matches determined for the corresponding monitored media signature streams (e.g., baseline and/or modified) identify the same source identifier (e.g., if three out of five signature matches have a matching source identifier). In some examples, the match selector 320 identifies the consensus signature match based on a weighted signature match strength. For example, if one signature match for a first one of the monitored media signature streams (e.g., baseline or modified) identified a first source identifier with a strong signature match strength but three other signature matches for three other of the monitored media signature streams (e.g., baseline and/or modified) identified a second source identifier with weaker signature match strengths, the match selector 320 could determine a consensus signature match based on weighting (combining) the weaker signature match strengths associated with the second source identifier and comparing its weighted signature match strength to the signature match strength associated with the first source identifier. However, other methods for identifying the consensus signature match may additionally and/or alternatively be used. The match selector 320 identifies the source identifier of the consensus signature match. In some examples, the match selector 320 provides the source identifier of the consensus signature to the example creditor interface 325. Once the example match selector identifies the source identifier of the consensus signature match from the signature matches that meet the threshold, process 715 completes and returns to process 700 of FIG. 7.

Figure 9:
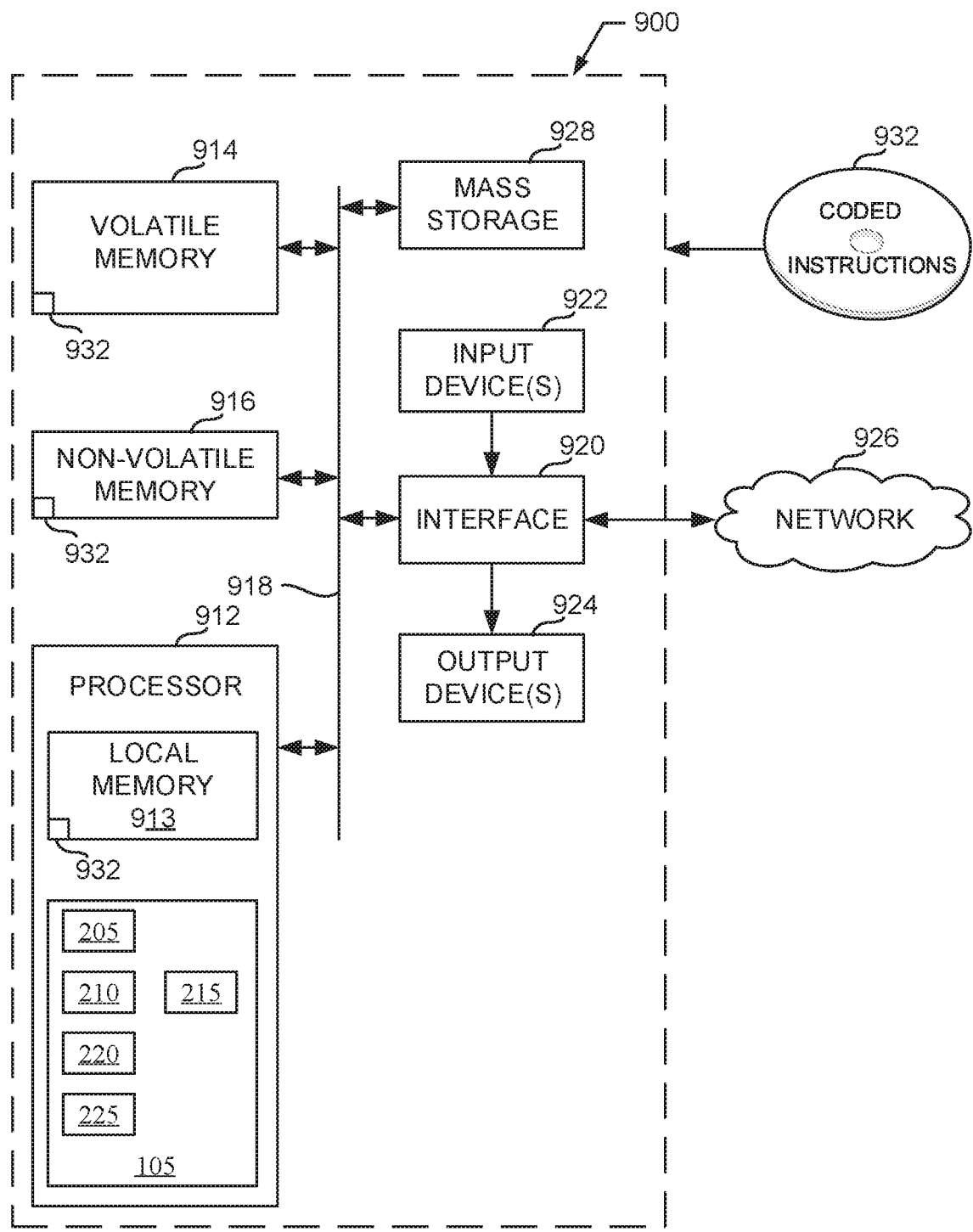
FIG. 9 is a block diagram of an example processing platform structured to execute the instructions of FIG. 6 to implement the media meter of FIGS. 1 and/or 2.

FIG. 9 is a block diagram of an example processor platform 1000 structured to execute the instructions of FIG. 6 to implement the example media meter 105 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media receiver 205, the example signature generator 210, the example noise reduction model(s), the example time determiner 220, and the example signature transmitter 225.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 7 and 8 may be stored in the mass storage device 928, in the volatile memory 914, in the non-volatile memory 916, and/or on a removable non-transitory computer readable storage medium such as a CD or DVD.

Figure 10:
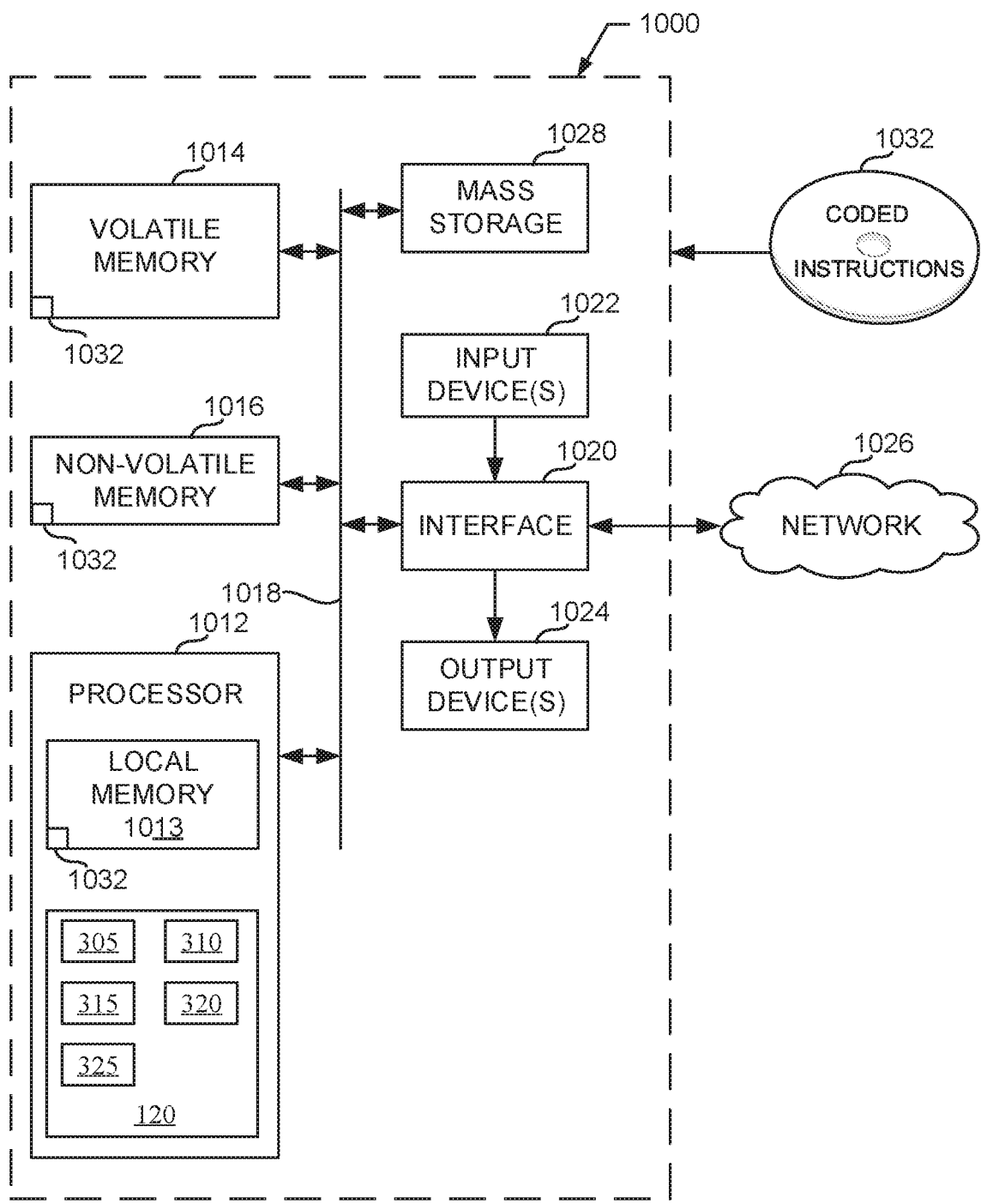
FIG. 10 is a block diagram of an example processing platform structured to execute the instructions of FIGS. 7 and 8 to implement the meter data analyzer of FIGS. 1 and/or 3.

FIG. 10 is a block diagram of an example processor platform 1000 structured to execute the instructions of FIGS. 7 and 8 to implement the example meter data analyzer 120 of FIG. 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 305, the example signature matcher 310, the example match strength determiner 315, the example match selector 320, and the example creditor interface 325.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 7 and 8 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that allow for optimization of signature matching in environments that contain ambient noise. The disclosed examples improve media crediting by applying noise reduction model(s) to monitored audio data and comparing the match results obtained for different signature streams generated for the same monitored media. The disclosed examples allow for more accurate crediting of media through comparing signature match results for different signatures streams generated from audio for the same monitored media but subjected to different noise reduction model(s) to identify the correct media content.

Example methods, apparatus, systems, and articles of manufacture to perform signature matching using noise cancellation models to achieve consensus are disclosed herein. Further examples and combinations thereof include the following:

Example 1 includes an apparatus comprising a signature matcher to compare a first stream of monitored media signatures to streams of reference signatures representative of corresponding reference media to determine a first signature match, the first stream of monitored media signatures generated by a media device meter from monitored media data associated with a time interval, and compare a second stream of monitored media signatures to the streams of reference signatures to determine a second signature match, the second stream of monitored media signatures generated by the media device meter from a modified version of the monitored media data associated with the time interval, a match selector to use at least one the first signature match or the second signature match to identify a first one of the reference media corresponding to the monitored media data, and a creditor interface to output identification data for the first one of the reference media identified with the at least one the first signature match or the second signature match, the identification data to be used to credit a media exposure corresponding to the monitored media data.

Example 2 includes the apparatus of example 1, wherein the monitored media data includes audio data collected by the media device meter with a microphone.

Example 3 includes the apparatus of example 2, wherein the modified version of the monitored media data includes a modified version of the audio data generated by the media device meter, the modified version of the audio data generated by applying a noise reduction model to the audio data.

Example 4 includes the apparatus of example 1, wherein the match selector is to determine that a first source identifier of a first reference signature stream associated with the first signature match matches a second source identifier of a second reference signature stream associated with the second signature match, and identify a reference media based on at least one of the first source identifier or the second source identifier.

Example 5 includes the apparatus of example 1, wherein the modified version of the monitored media data associated with the time interval is a first modified version, and the signature matcher is to compare a third stream of monitored media signatures to the streams of reference signatures to determine a third signature match, the third stream of monitored media signatures generated by the media device meter from a second modified version of the monitored media data associated with the time interval.

Example 6 includes the apparatus of example 5, wherein the match selector is to determine that a first source identifier of a first reference signature stream associated with the first signature match, a second source identifier of a second reference signature stream associated with the second signature match, and a third source identifier of a third reference signature stream associated with the third signature match do not match, determine whether at least one of a first strength of the first signature match, a second strength of the second signature match, or a third strength of the third signature match meets a threshold, and identify the first one of the reference media based on which one or more of the first strength associated with the first source identifier, the second strength associated with the second source identifier, and the third strength associated with the third source identifier meet the threshold.

Example 7 includes the apparatus of example 5, wherein the match selector is to determine that a first source identifier of a first reference signature stream associated with the first signature match matches a second source identifier of a second reference signature stream associated with the second signature match, determine that the first source identifier and the second source identifier do not match a third source identifier of a third reference signature stream associated with the third signature match, determine that the first source identifier and the second source identifier are a majority over the third source identifier, and identify the first one of the reference media based on at least one of the first source identifier and the second source identifier.

Example 8 includes a non-transitory computer readable medium comprising instructions which, when executed, cause a machine to at least compare a first stream of monitored media signatures to streams of reference signatures representative of corresponding reference media to determine a first signature match, the first stream of monitored media signatures generated by a media device meter from monitored media data associated with a time interval, compare a second stream of monitored media signatures to the streams of reference signatures to determine a second signature match, the second stream of monitored media signatures generated by the media device meter from a modified version of the monitored media data associated with the time interval, use at least one the first signature match or the second signature match to identify a first one of the reference media corresponding to the monitored media data, and output identification data for the first one of the reference media identified with the at least one the first signature match or the second signature match, the identification data to be used to credit a media exposure corresponding to the monitored media data.

Example 9 includes the non-transitory computer readable medium of example 8, wherein the monitored media data includes audio data collected by the media device meter with a microphone.

Example 10 includes the non-transitory computer readable medium of example 9, wherein the modified version of the monitored media data includes a modified version of the audio data generated by the media device meter, the modified version of the audio data generated by applying a noise reduction model to the audio data.

Example 11 includes the non-transitory computer readable medium of example 8, wherein the instructions cause the machine to determine that a first source identifier of a first reference signature stream associated with the first signature match matches a second source identifier of a second reference signature stream associated with the second signature match, and identify a reference media based on at least one of the first source identifier or the second source identifier.

Example 12 includes the non-transitory computer readable medium of example 8, wherein the modified version of the monitored media data associated with the time interval is a first modified version, and wherein the instructions cause the machine to compare a third stream of monitored media signatures to the streams of reference signatures to determine a third signature match, the third stream of monitored media signatures generated by the media device meter from a second modified version of the monitored media data associated with the time interval.

Example 13 includes the non-transitory computer readable medium of example 12, wherein the instructions cause the machine to determine that a first source identifier of a first reference signature stream associated with the first signature match, a second source identifier of a second reference signature stream associated with the second signature match, and a third source identifier of a third reference signature stream associated with the third signature match do not match, determine whether at least one of a first strength of the first signature match, a second strength of the second signature match, or a third strength of the third signature match meets a threshold, and identify the first one of the reference media based on which one or more of the first strength associated with the first source identifier, the second strength associated with the second source identifier, or the third strength associated with the third source identifier meet the threshold.

Example 14 includes the non-transitory computer readable medium of example 12, wherein the instructions cause the machine to determine that a first source identifier of a first reference signature stream associated with the first signature match matches a second source identifier of a second reference signature stream associated with the second signature match, determine that the first source identifier and the second source identifier do not match a third source identifier of a third reference signature stream associated with the third signature match, determine that the first source identifier and the second source identifier are a majority over the third source identifier, and identify the first one of the reference media based on at least one of the first source identifier and the second source identifier.

Example 15 includes a method comprising comparing a first stream of monitored media signatures to streams of reference signatures representative of corresponding reference media to determine a first signature match, the first stream of monitored media signatures generated by a media device meter from monitored media data associated with a time interval, comparing a second stream of monitored media signatures to the streams of reference signatures to determine a second signature match, the second stream of monitored media signatures generated by the media device meter from a modified version of the monitored media data associated with the time interval, using at least one the first signature match or the second signature match to identify a first one of the reference media corresponding to the monitored media data, and outputting identification data for the first one of the reference media identified with the at least one the first signature match or the second signature match, the identification data to be used to credit a media exposure corresponding to the monitored media data.

Example 16 includes the method of example 15, wherein the monitored media data includes audio data collected by the media device meter with a microphone, and wherein the modified version of the monitored media data includes a modified version of the audio data generated by the media device meter, the modified version of the audio data generated by applying a noise reduction model to the audio data.

Example 17 includes the method of example 15, further including determining that a first source identifier of a first reference signature stream associated with the first signature match matches a second source identifier of a second reference signature stream associated with the second signature match, and identifying a reference media based on at least one of the first source identifier or the second source identifier.

Example 18 includes the method of example 15, wherein the modified version of the monitored media data associated with the time interval is a first modified version, and further including comparing a third stream of monitored media signatures to the streams of reference signatures to determine a third signature match, the third stream of monitored media signatures generated by the media device meter from a second modified version of the monitored media data associated with the time interval.

Example 19 includes the method of example 18, further including determining that a first source identifier of a first reference signature stream associated with the first signature match, a second source identifier of a second reference signature stream associated with the second signature match, and a third source identifier of a third reference signature stream associated with the third signature match do not match, determining whether at least one of a first strength of the first signature match, a second strength of the second signature match, or a third strength of the third signature match meets a threshold, and identifying the first one of the reference media based on which one or more of the first strength associated with the first source identifier, the second strength associated with the second source identifier, and the third strength associated with the third source identifier meet the threshold.

Example 20 includes the method of example 18, further including determining that a first source identifier of a first reference signature stream associated with the first signature match matches a second source identifier of a second reference signature stream associated with the second signature match, determining that the first source identifier and the second source identifier do not match a third source identifier of a third reference signature stream associated with the third signature match, determining that the first source identifier and the second source identifier are a majority over the third source identifier, and identifying the first one of the reference media based on at least one of the first source identifier and the second source identifier.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a signature matcher to:
compare a first stream of monitored media signatures to streams of reference signatures representative of corresponding reference media to determine a first signature match, the first stream of monitored media signatures generated by a media device meter from monitored media data associated with a time interval; and
compare a second stream of monitored media signatures to the streams of reference signatures to determine a second signature match, the second stream of monitored media signatures generated by the media device meter from a modified version of the monitored media data associated with the time interval;
a match selector to use at least one the first signature match or the second signature match to identify a first one of the reference media corresponding to the monitored media data; and
a creditor interface to output identification data for the first one of the reference media identified with the at least one the first signature match or the second signature match, the identification data to be used to credit a media exposure corresponding to the monitored media data.

2. The apparatus of claim 1, wherein the monitored media data includes audio data collected by the media device meter with a microphone.

3. The apparatus of claim 2, wherein the modified version of the monitored media data includes a modified version of the audio data generated by the media device meter, the modified version of the audio data generated by applying a noise reduction model to the audio data.

4. The apparatus of claim 1, wherein the match selector is to:
determine that a first source identifier of a first reference signature stream associated with the first signature match matches a second source identifier of a second reference signature stream associated with the second signature match; and
identify a reference media based on at least one of the first source identifier or the second source identifier.

5. The apparatus of claim 1, wherein the modified version of the monitored media data associated with the time interval is a first modified version, and the signature matcher is to compare a third stream of monitored media signatures to the streams of reference signatures to determine a third signature match, the third stream of monitored media signatures generated by the media device meter from a second modified version of the monitored media data associated with the time interval.

6. The apparatus of claim 5, wherein the match selector is to:
determine that a first source identifier of a first reference signature stream associated with the first signature match, a second source identifier of a second reference signature stream associated with the second signature match, and a third source identifier of a third reference signature stream associated with the third signature match do not match;
determine whether at least one of a first strength of the first signature match, a second strength of the second signature match, or a third strength of the third signature match meets a threshold; and
identify the first one of the reference media based on which one or more of the first strength associated with the first source identifier, the second strength associated with the second source identifier, and the third strength associated with the third source identifier meet the threshold.

7. The apparatus of claim 5, wherein the match selector is to:
determine that a first source identifier of a first reference signature stream associated with the first signature match matches a second source identifier of a second reference signature stream associated with the second signature match;
determine that the first source identifier and the second source identifier do not match a third source identifier of a third reference signature stream associated with the third signature match;

determine that the first source identifier and the second source identifier are a majority over the third source identifier; and identify the first one of the reference media based on at least one of the first source identifier and the second source identifier.

8. A non-transitory computer readable medium comprising instructions which, when executed, cause a machine to at least:

compare a first stream of monitored media signatures to streams of reference signatures representative of corresponding reference media to determine a first signature match, the first stream of monitored media signatures generated by a media device meter from monitored media data associated with a time interval;

compare a second stream of monitored media signatures to the streams of reference signatures to determine a second signature match, the second stream of monitored media signatures generated by the media device meter from a modified version of the monitored media data associated with the time interval;

use at least one the first signature match or the second signature match to identify a first one of the reference media corresponding to the monitored media data; and output identification data for the first one of the reference media identified with the at least one the first signature match or the second signature match, the identification data to be used to credit a media exposure corresponding to the monitored media data.

9. The non-transitory computer readable medium of claim 8, wherein the monitored media data includes audio data collected by the media device meter with a microphone.

10. The non-transitory computer readable medium of claim 9, wherein the modified version of the monitored media data includes a modified version of the audio data generated by the media device meter, the modified version of the audio data generated by applying a noise reduction model to the audio data.

11. The non-transitory computer readable medium of claim 8, wherein the instructions cause the machine to:

determine that a first source identifier of a first reference signature stream associated with the first signature match matches a second source identifier of a second reference signature stream associated with the second signature match; and identify a reference media based on at least one of the first source identifier or the second source identifier.

12. The non-transitory computer readable medium of claim 8, wherein the modified version of the monitored media data associated with the time interval is a first modified version, and wherein the instructions cause the machine to compare a third stream of monitored media signatures to the streams of reference signatures to determine a third signature match, the third stream of monitored media signatures generated by the media device meter from a second modified version of the monitored media data associated with the time interval.

13. The non-transitory computer readable medium of claim 12, wherein the instructions cause the machine to:

determine that a first source identifier of a first reference signature stream associated with the first signature match, a second source identifier of a second reference signature stream associated with the second signature match, and a third source identifier of a third reference signature stream associated with the third signature match do not match;

determine whether at least one of a first strength of the first signature match, a second strength of the second signature match, or a third strength of the third signature match meets a threshold; and identify the first one of the reference media based on which one or more of the first strength associated with the first source identifier, the second strength associated with the second source identifier, or the third strength associated with the third source identifier meet the threshold.

14. The non-transitory computer readable medium of claim 12, wherein the instructions cause the machine to:

determine that a first source identifier of a first reference signature stream associated with the first signature match matches a second source identifier of a second reference signature stream associated with the second signature match;

determine that the first source identifier and the second source identifier do not match a third source identifier of a third reference signature stream associated with the third signature match;

determine that the first source identifier and the second source identifier are a majority over the third source identifier; and identify the first one of the reference media based on at least one of the first source identifier and the second source identifier.

15. A method comprising:

comparing a first stream of monitored media signatures to streams of reference signatures representative of corresponding reference media to determine a first signature match, the first stream of monitored media signatures generated by a media device meter from monitored media data associated with a time interval;

comparing a second stream of monitored media signatures to the streams of reference signatures to determine a second signature match, the second stream of monitored media signatures generated by the media device meter from a modified version of the monitored media data associated with the time interval;

using at least one the first signature match or the second signature match to identify a first one of the reference media corresponding to the monitored media data; and outputting identification data for the first one of the reference media identified with the at least one the first signature match or the second signature match, the identification data to be used to credit a media exposure corresponding to the monitored media data.

16. The method of claim 15, wherein the monitored media data includes audio data collected by the media device meter with a microphone, and wherein the modified version of the monitored media data includes a modified version of the audio data generated by the media device meter, the modified version of the audio data generated by applying a noise reduction model to the audio data.

17. The method of claim 15, further including:

determining that a first source identifier of a first reference signature stream associated with the first signature match matches a second source identifier of a second reference signature stream associated with the second signature match; and identifying a reference media based on at least one of the first source identifier or the second source identifier.

18. The method of claim 15, wherein the modified version of the monitored media data associated with the time interval is a first modified version, and further including comparing a third stream of monitored media signatures to the streams of reference signatures to determine a third signature match, the third stream of monitored media signatures generated by the media device meter from a second modified version of the monitored media data associated with the time interval.

19. The method of claim 18, further including:
   determining that a first source identifier of a first reference signature stream associated with the first signature match, a second source identifier of a second reference signature stream associated with the second signature match, and a third source identifier of a third reference signature stream associated with the third signature match do not match;
   determining whether at least one of a first strength of the first signature match, a second strength of the second signature match, or a third strength of the third signature match meets a threshold; and
   identifying the first one of the reference media based on which one or more of the first strength associated with the first source identifier, the second strength associated with the second source identifier, and the third strength associated with the third source identifier meet the threshold.

20. The method of claim 18, further including:
   determining that a first source identifier of a first reference signature stream associated with the first signature match matches a second source identifier of a second reference signature stream associated with the second signature match;
   determining that the first source identifier and the second source identifier do not match a third source identifier of a third reference signature stream associated with the third signature match;
   determining that the first source identifier and the second source identifier are a majority over the third source identifier; and
   identifying the first one of the reference media based on at least one of the first source identifier and the second source identifier.

* * * * *

UNITED STATES PATENT AND TRADEMARK OFFICE
CERTIFICATE OF CORRECTION

| | | |
|---|---|---|
| PATENT NO. | : 11,501,793 B2 | Page 1 of 1 |
| APPLICATION NO. | : 16/994095 | |
| DATED | : November 15, 2022 | |
| INVENTOR(S) | : Davis et al. | |

It is certified that error appears in the above-identified patent and that said Letters Patent is hereby corrected as shown below:

In the Drawings

Sheet 9, FIG. 7, under reference numeral 725, replace "IDENTIFER" with -- IDENTIFIER --

Signed and Sealed this
Seventeenth Day of October, 2023

*Katherine Kelly Vidal*

Katherine Kelly Vidal
*Director of the United States Patent and Trademark Office*